(12) United States Patent
Baxter et al.

(10) Patent No.: US 9,316,099 B2
(45) Date of Patent: Apr. 19, 2016

(54) ARC RFID ANTENNA

(75) Inventors: Daniel Brent Baxter, Tomball, TX (US); Terry Jason Smith, Friendswood, TX (US); My-Lan Thi Hiscox, Magnolia, TX (US); Cees Tempelaars, Houston, TX (US)

(73) Assignee: Cameron International Corporation, Houston, TX (US)

( * ) Notice: Subject to any disclaimer, the term of this patent is extended or adjusted under 35 U.S.C. 154(b) by 998 days.

(21) Appl. No.: 13/387,597

(22) PCT Filed: Aug. 2, 2010

(86) PCT No.: PCT/US2010/044172
§ 371 (c)(1),
(2), (4) Date: Mar. 21, 2012

(87) PCT Pub. No.: WO2011/017278
PCT Pub. Date: Feb. 10, 2011

(65) Prior Publication Data
US 2012/0172072 A1 Jul. 5, 2012

Related U.S. Application Data

(60) Provisional application No. 61/230,729, filed on Aug. 2, 2009.

(51) Int. Cl.
*H04Q 5/22* (2006.01)
*E21B 44/00* (2006.01)
(Continued)

(52) U.S. Cl.
CPC .............. *E21B 44/00* (2013.01); *E21B 17/006* (2013.01); *E21B 17/01* (2013.01); *E21B 19/143* (2013.01);
(Continued)

(58) Field of Classification Search
CPC ..... G06K 7/0008; E21B 17/01; E21B 17/006; E21B 19/143; E21B 44/00
USPC ....................................... 340/10.1; 166/255.1
See application file for complete search history.

(56) References Cited

U.S. PATENT DOCUMENTS 3,503,460 A * 3/1970 Gadbois ........................... 175/5
5,202,680 A 4/1993 Savage
(Continued)

FOREIGN PATENT DOCUMENTS

GB 1 256 134 A 12/1971
GB 1256134 A 12/1971
(Continued)

OTHER PUBLICATIONS

PCT International Search Report and Written Opinion dated dated Sep. 21, 2010 for PCT Application No. PCT/US2011/044172, filed Aug. 2, 2010.
(Continued)

*Primary Examiner* — John A Tweel, Jr.
(74) *Attorney, Agent, or Firm* — Chamberlain Hrdlicka

(57) ABSTRACT

A system, in certain embodiments, includes a spider configured to support multiple mineral extraction riser segments. The system also includes a gimbal disposed below the spider and configured to support the spider during operation. The system further includes one or more arcuate radio frequency identification (RFID) antennas disposed within the gimbal and/or the spider. The one or more arcuate RFID antennas are configured to communicate with one or more RFID tags coupled to each riser segment.

15 Claims, 13 Drawing Sheets

(51) Int. Cl.
*G06K 7/00* (2006.01)
*E21B 17/00* (2006.01)
*E21B 19/14* (2006.01)
*E21B 17/01* (2006.01)
*E21B 47/01* (2012.01)
*G06K 7/10* (2006.01)

(52) U.S. Cl.
CPC ............ *E21B 47/011* (2013.01); *G06K 7/0008* (2013.01); *G06K 7/10316* (2013.01); *G06K 7/10336* (2013.01)

(56) References Cited

U.S. PATENT DOCUMENTS

| | | | |
|---|---|---|---|
| 5,395,183 A * | 3/1995 | Watkins | ........................ 166/350 |
| 6,347,292 B1 | 2/2002 | Denny et al. | |
| 7,159,654 B2 * | 1/2007 | Ellison et al. | ............ 166/250.01 |
| 2002/0158120 A1* | 10/2002 | Zierolf | .......................... 235/375 |
| 2008/0128138 A1* | 6/2008 | Radi | ........................... 166/350 |

FOREIGN PATENT DOCUMENTS

| | | |
|---|---|---|
| WO | 03/062588 A1 | 7/2003 |
| WO | 2005/100733 A1 | 10/2005 |
| WO | 2005100733 A1 | 10/2005 |

OTHER PUBLICATIONS

International Search Report for PCT/US2010/044172 dated Sep. 29, 2010.

* cited by examiner

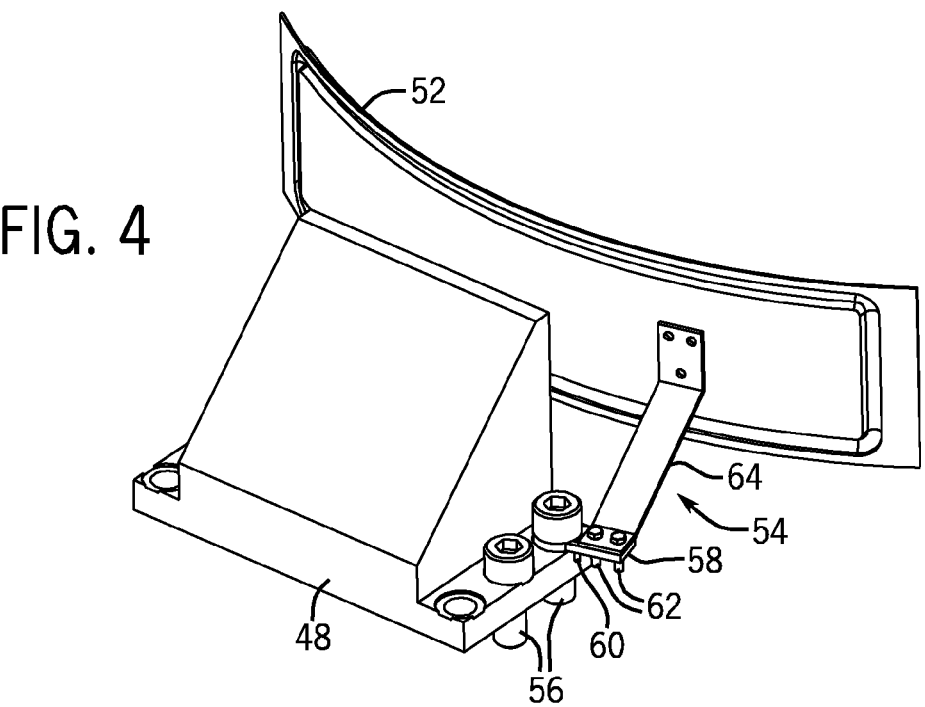
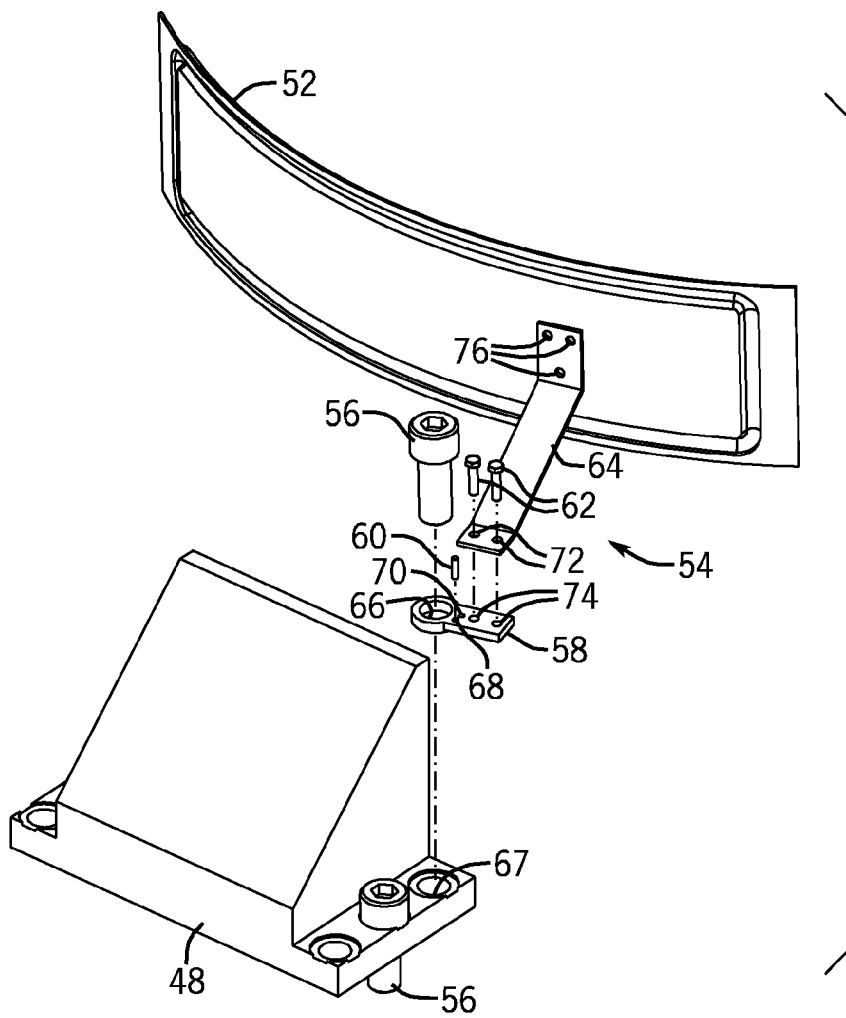

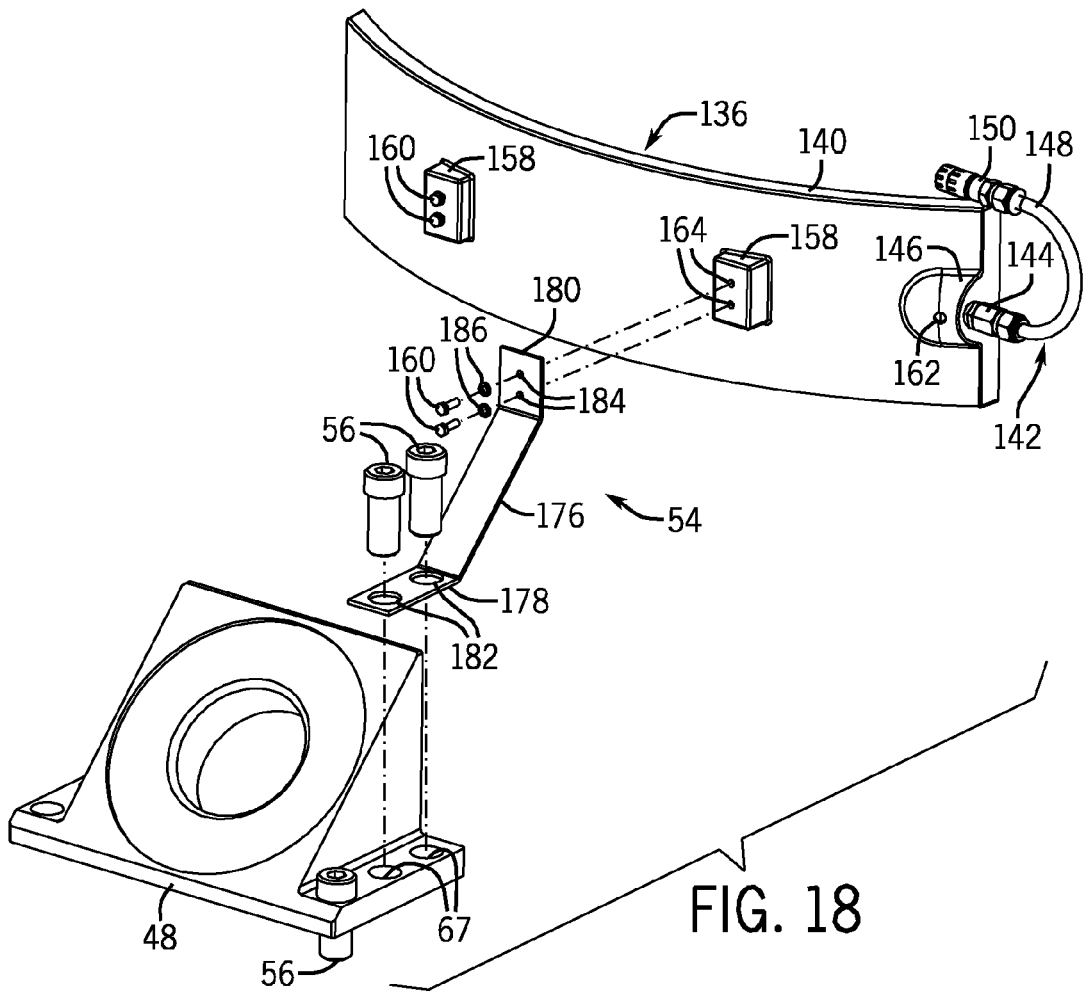
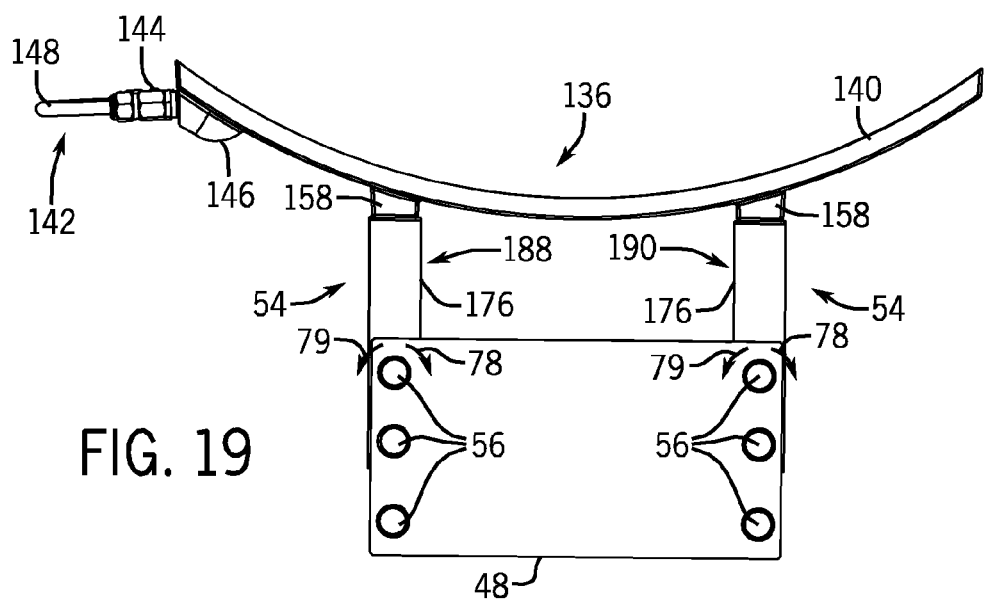

ARC RFID ANTENNA

CROSS REFERENCE TO RELATED APPLICATION

This application is a 35 U.S.C. §371 national stage application of PCT/US2010/044172 filed Aug. 2, 2010, entitled "ARC RFID Antenna," which claims priority to U.S. Provisional Patent Application No. 61/230,729, entitled "ARC RFID Antenna," filed on Aug. 2, 2009, both of which are herein incorporated by reference in their entirety for all purposes.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, oil and natural gas have a profound effect on modern economies and societies. Indeed, devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for such natural resources, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling and/or extraction operations.

To extract the resources from a well, a drilling riser may extend from the well to a rig. For example, in a subsea well, the drilling riser may extend from the seafloor up to a rig on the surface of the sea. A typical drilling riser may include a flanged assembly formed from steel, and the drilling riser may perform multiple functions. In addition to transporting drilling fluid into the well, the riser may provide pipes to allow drilling fluids, mud, and cuttings to flow up from the well.

The riser is typically constructed by securing riser segments together via a flanged connection. Specifically, a first riser segment may be lowered from the rig into the sea. A subsequent riser segment may then be secured to the first segment, before lowering the entire stack. In this manner, a riser of a desired length may be formed. Proper tracking and management of riser segments may extend the useful life of each segment. For example, riser segments positioned at greater depths may experience greater stress than riser segments positioned at shallower depths. Consequently, riser segments may be rotated through various depths to evenly distribute the loads across an inventory of riser segments. Unfortunately, because typical riser segment tracking and management is performed manually, mistakes regarding riser segment deployment may be introduced. Such mistakes may result in decreased riser segment longevity and increased costs.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 4 is a perspective view of an antenna mounting assembly, as shown in FIG. 2, in accordance with certain embodiments of the present technique;

FIG. 5 is an exploded view of the antenna mounting assembly, as shown in FIG. 4, in accordance with certain embodiments of the present technique;

FIG. 18 is an exploded view of the antenna mounting assembly, as shown in FIG. 17, including a bracket configured to mount to the bearing via multiple fasteners.

FIG. 19 is a bottom view of the antenna mounting assembly as shown in FIG. 17.

DETAILED DESCRIPTION OF SPECIFIC EMBODIMENTS

Figure 1:
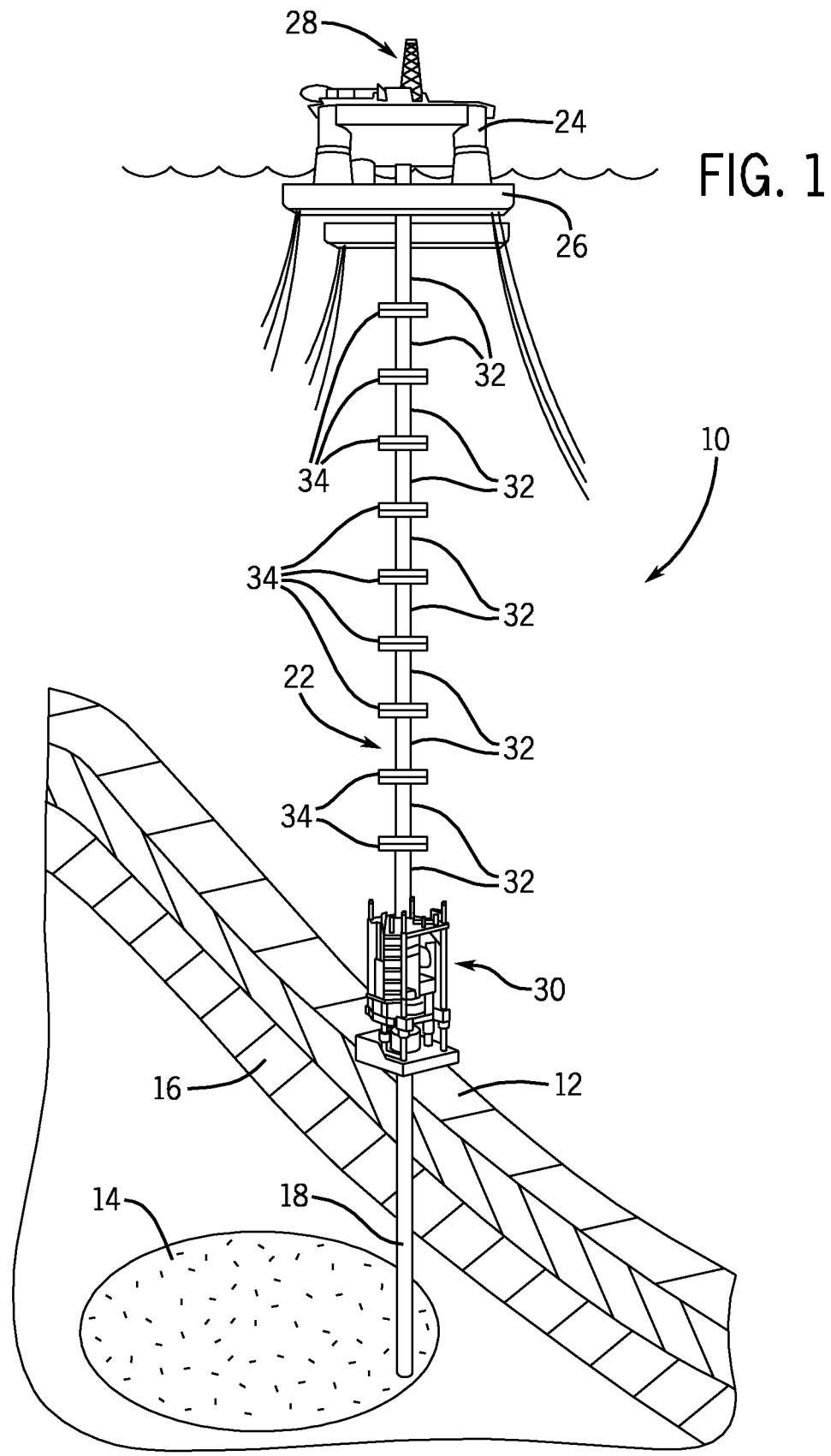
FIG. 1 is a block diagram of a mineral extraction system in accordance with certain embodiments of the present technique.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure may facilitate automatic tracking and management of oil and gas equipment, such as tubular segments (e.g., riser segments). As discussed below, embodiments of the present disclosure utilize transmitters and receivers to collect data as components (e.g., coaxial tubular components) pass by one another in a mineral extraction system, such as a subsea mineral extraction system having multiple segments leading toward a well. Although the following discussion refers to riser segments, spiders, and gimbals, the disclosed embodiments may be employed with any tubular components that pass by one another in a coaxial or concentric arrangement, or any other suitable mineral extraction equipment.

In certain embodiments, one or more transmitters may be mounted to each riser segment, while one or more corresponding antennas may be mounted to a spider and/or a gimbal of the rig. As each riser segment is lowered through the spider and gimbal, the antennas may automatically receive or discern a signal from the transmitters identifying the riser segment. In this manner, each riser segment is automatically tracked as it is lowered through a drilling spider and/or gimbal. Such a configuration may substantially reduce or eliminate errors inherent in manual riser segment tracking procedures.

In certain embodiments, each riser segment may include two transmitters embedded within each flange, e.g., a total of four transmitters. The transmitters may be positioned on opposite radial sides of the flange. In certain configurations, each transmitter is a radio frequency identification (RFID) tag configured to communicate with a corresponding RFID antenna. The antennas may be positioned on opposite radial sides of a gimbal bore through which each riser segment passes as it is being lowered into the sea. The position and range of the antennas may be configured to receive a signal from at least one transmitter regardless of riser segment position within the bore. This configuration may ensure that each riser segment is tracked as it passes through the bore, thereby providing accurate tracking and management information.

In certain embodiments, the antennas are arc-shaped to provide a uniquely expanded read range within the bore to receive a signal from at least one transmitter per riser segment. In certain embodiments, the antennas are configured to receive a low frequency (e.g., between approximately 30 to 300 kHz), a high frequency (e.g., between approximately 3 to 30 MHz), or an ultra high frequency (e.g., between approximately 0.3 to 3 GHz) RFID transmission. The radius of curvature of each antenna may be substantially equal to the radius of curvature of the bore. In addition, the antenna may include an arcuate plate including a recess disposed about a perimeter of the arcuate plate. A conductive wire may be disposed within the recess, and extend about the recess through multiple turns. The number of turns may be selected to match the inductance of an RFID tag and the surrounding metallic environment. Also, the number of turns and other characteristics may be tuned to enhance coupling with the RFID tag or tags. Furthermore, the conductive wire may be secured to the recess by an adhesive connection.

FIG. 1 is a block diagram that illustrates an embodiment of a subsea mineral extraction system 10. The illustrated mineral extraction system 10 can be configured to extract various minerals and natural resources, including hydrocarbons (e.g., oil and/or natural gas), or configured to inject substances into the earth. In some embodiments, the mineral extraction system 10 is land-based (e.g., a surface system) or subsea (e.g., a subsea system). As illustrated, the system 10 includes a wellhead 12 coupled to a mineral deposit 14 via a well 16, wherein the well 16 includes a well-bore 18.

The wellhead assembly 12 typically includes multiple components that control and regulate activities and conditions associated with the well 16. For example, the wellhead assembly 12 generally includes bodies, valves and seals that route produced minerals from the mineral deposit 14, provide for regulating pressure in the well 16, and provide for the injection of chemicals into the well-bore 18 (down-hole). In the illustrated embodiment, the wellhead 12 may include a tubing spool, a casing spool, and a hanger (e.g., a tubing hanger or a casing hanger). The system 10 may include other devices that are coupled to the wellhead 12, such as a blowout preventer (BOP) stack 30 and devices that are used to assemble and control various components of the wellhead 12.

A drilling riser 22 may extend from the BOP stack 30 to a rig 24, such as a platform or floating vessel 26. The rig 24 may be positioned above the well 16. The rig 24 may include the components suitable for operation of the mineral extraction system 10, such as pumps, tanks, power equipment, and any other components. The rig 24 may include a derrick 28 to support the drilling riser 22 during running and retrieval, a tension control mechanism, and any other components.

The wellhead assembly may include a blowout preventer (BOP) 30. The BOP 30 may consist of a variety of valves, fittings and controls to block oil, gas, or other fluid from exiting the well in the event of an unintentional release of pressure or an overpressure condition. These valves, fittings, and controls may also be referred to as a "BOP stack."

The drilling riser may carry drilling fluid (e.g., "mud) from the rig 24 to the well 16, and may carry the drilling fluid ("returns"), cuttings, or any other substance, from the well 16 to the rig 24. The drilling riser 22 may include a main line having a large diameter and one or more auxiliary lines. The main line may be connected centrally over the bore (such as coaxially) of the well 16, and may provide a passage from the rig to the well. The auxiliary lines may include choke lines, kill lines, hydraulic lines, glycol injection, mud return, and/or mud boost lines. For example, some of the auxiliary lines may be coupled to the BOP 30 to provide choke and kill functions to the BOP 30.

As described further below, the drilling riser 22 may be formed from numerous "joints" or segments 32 of pipe, coupled together via flanges 34, or any other suitable devices. Additionally, the drilling riser 22 may include flotation devices, clamps, or other devices distributed along the length of the drilling riser 22. As the riser 22 is being assembled, a riser segment 32 is secured to a spider by multiple dogs that engage the flange 34. A subsequent riser segment 32 is then bolted to the riser segment 32 within the spider. The riser 22 is then lowered toward the well, and the next segment 32 is secured to the spider. This process facilitates riser construction by building the riser 22 one segment 32 at a time. The spider is supported by a gimbal that enables the spider rotate and/or tilt relative to the platform 26 as the platform moves with the wind and/or waves.

Figure 2:
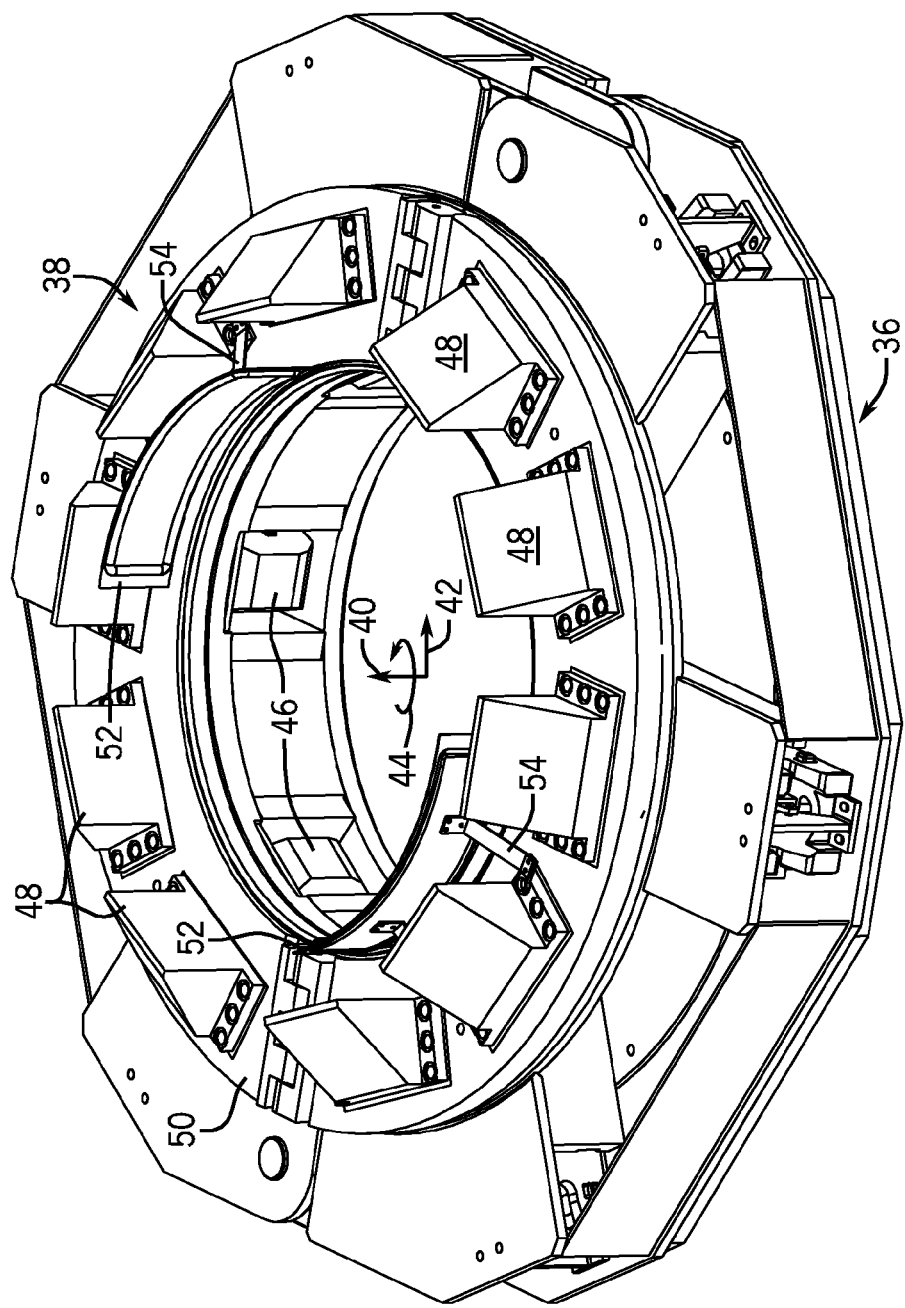
FIG. 2 is a perspective view of a gimbal and spider assembly, including a pair of arc antennas configured to communicate with transmitters coupled to riser segments in accordance with certain embodiments of the present technique.

FIG. 2 is a perspective view of a gimbal and spider assembly, including a pair of arc antennas configured to communicate with transmitters coupled to riser segments. As illustrated, a riser segment support device or spider 36 is disposed adjacent to a gimbal 38. As will be appreciated, the present perspective view shows the bottom side (i.e., side facing the sea) of the gimbal 38 and spider 36. In operation, the spider 36 is positioned above the gimbal 38 (i.e., away from the sea). Specifically, the spider 36 is aligned with the gimbal 38 in an axial direction 40. In other words, there is substantially no offset in a radial direction 42. As illustrated, hydraulically actuated members or dogs 46 are spaced about the spider 36 in a circumferential direction 44. The dogs 46 serve to support riser segments 32 during the deployment of the riser 22 toward the wellhead 12 and when breaking down the riser 22. As will be appreciated, the gimbal 38 couples the spider 36 to a rotary table and facilitates movement of the spider 36 relative to the rig 24. Specifically, bearings 48 coupled to a base plate 50 support the spider 36 and enable the spider to move relative to the rotary table. Motion of the floating vessel 26 relative to the riser 22 causes the compression and expansion of the bearings 48, thereby facilitating motion of the spider 36 relative to the floating vessel 26.

As discussed in detail below, a pair of arc antennas 52 are mounted to the gimbal 38 and configured to read RFID tags imbedded in risers. Specifically, each antenna 52 is mounted to a bearing 48 via mounting assemblies 54. As riser segments 32 pass through the gimbal 38 and spider 36, RFID tags within the riser segments 32 traverse a read range of one or both antennas 52. Once within the read range, the antennas 52 discern an RFID tag identification number indicative of a riser segment identification number from an RFID signal. In this manner, each riser segment 32 may be automatically tracked and monitored as the riser 22 is assembled. Such a configuration may facilitate automatic sequencing of the riser segments 32. For example, as discussed in detail below, each riser segment 32 may be rotated through various depths throughout its useful life.

While two antennas 52 are employed in the present embodiment, alternative embodiments may include more or fewer antennas 52. For example, certain embodiments may include 1, 2, 3, 4, 5, 6, 7, 8, 9, 10 or more antennas 52. In addition, the illustrated antennas 52 are coupled to the gimbal 38 and are located at a similar axial position to the gimbal 38. In alternative embodiments, the antennas 52 may be coupled to the spider 36 and located at a similar axial position to the spider 36.

Figure 3:
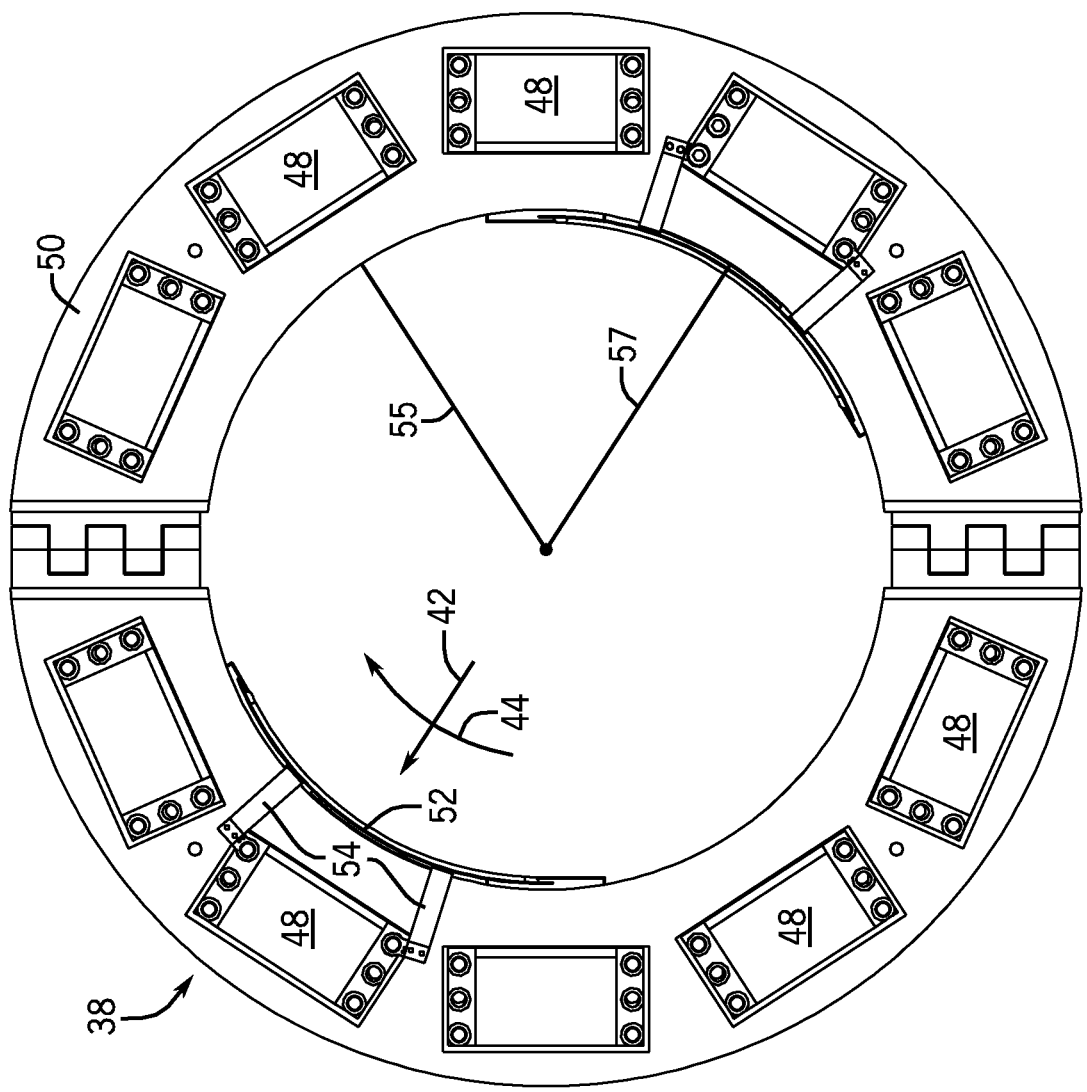
FIG. 3 is a bottom view of a top half of the gimbal, as shown in FIG. 2, in accordance with certain embodiments of the present technique.

FIG. 3 is a bottom view of the gimbal, as shown in FIG. 2. As previously discussed, each antenna 52 is secured to a respective bearing 48 by a pair of mounting assemblies 54. As discussed in detail below, the mounting assemblies 54 serve to both restrict movement of the antennas 52 and facilitate mounting without any addition to the gimbal structure. Furthermore, as illustrated, a radius of curvature 57 of the antennas 52 is substantially equal to a radius of curvature 55 of the gimbal 38. As discussed in detail below, the radius of curvature 57 of the antennas 52 may establish a read range sufficient to detect at least one RFID tag of each riser segment 32 regardless of riser segment position within the bore of the gimbal 38 and/or spider 36.

FIG. 4 is a perspective view of an embodiment of an antenna mounting assembly 54, as shown in FIG. 2. As previously discussed, each antenna 52 is mounted to a bearing 48 of the gimbal 38 by the mounting assembly 54. As illustrated, the mounting assembly 54 is secured to a fastener 56 that couples the bearing 48 to the base plate 50. In this manner, the antennas 52 may be secured to the gimbal 38 without any modification to the gimbal structure, or the permanent addition of mounting hardware. Specifically, the mounting assembly 54 includes a washer bracket 58, a dowel 60, fasteners 62 and a flat bracket 64. As discussed in detail below, the washer bracket 58 is coupled to the fastener 56. The flat bracket 64 is, in turn, coupled to the washer bracket 58 via a pair of fasteners 62. As will be appreciated, alternative embodiments may include more or fewer fasteners 62. For example, certain embodiments may include 1, 2, 3, 4, 5, 6, or more fasteners 62. Rotation of the washer bracket 58 about the fastener 56 is blocked by the dowel 60. Specifically, contact between the dowel 60 and the bearing 48 limits movement of the mounting assembly 54. Finally, the flat bracket 64 is coupled to the antenna 52 by additional fasteners or an adhesive connection. As shown in FIG. 3, a second mounting assembly 54 is disposed on the opposite circumferential side of the bearing 48. Such a configuration facilitates mounting of the antennas 52 to the gimbal 38 without any structural modification to the gimbal 38. In alternative embodiments, the gimbal 38 may be specifically modified to accommodate the antennas 52.

FIG. 5 is an exploded view of an embodiment of the antenna mounting assembly 54, as shown in FIG. 4. As illustrated, an orifice 66 within the washer bracket 58 is first aligned with an opening 67 in the bearing 48. The dowel 60 is then inserted into one of two holes 68 or 70 depending on which circumferential side of the bearing 48 the washer bracket 58 is attached. In the present figure, the dowel 60 is inserted into the opening 68 to block rotation of the washer bracket 58 relative to the bearing 48. The fastener 56 is then inserted through the orifice 66 of the washer bracket 58, and into the opening 67. As previously discussed, the fastener 56 serves to secure the bearing 48 to the base plate 50.

Fasteners 62 are then inserted through holes 72 in the flat bracket 64, and into holes 74 of the washer bracket 58. In certain configurations, the fasteners 62 may be bolts that secure the flat bracket 64 to the washer bracket 58 via nuts coupled to the bolts. Alternatively, the holes 74 may be threaded such that complementary threaded bolts 62 may be secured to the holes 74, thereby coupling the flat bracket 64 to the washer bracket 58. Openings 76 in the flat bracket may serve to receive fasteners that couple the antenna 52 to the mounting assembly 54. As will be appreciated, a similar configuration may be employed on the opposite circumferential side of the bearing 48, thereby providing a pair of mounting assemblies 54 to secure the antenna 52 to the gimbal 38.

Figure 6:
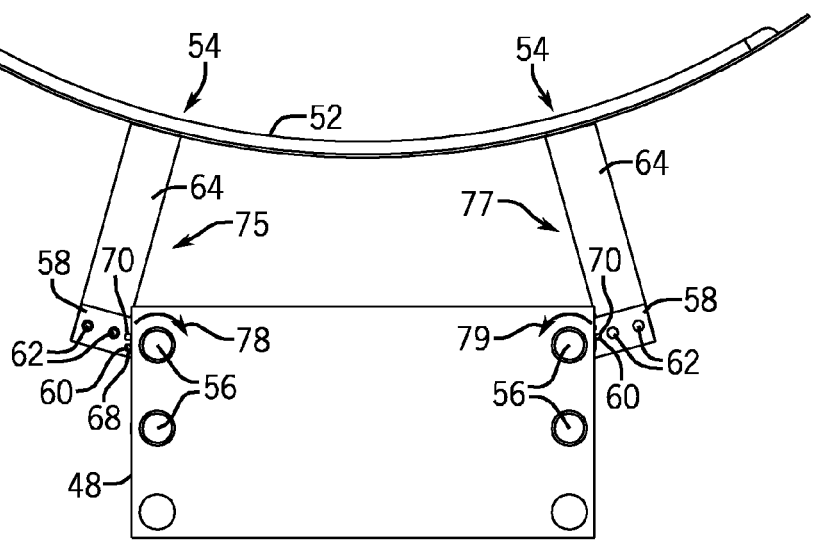
FIG. 6 is a bottom view of the antenna mounting assembly, as shown in FIG. 4, in accordance with certain embodiments of the present technique.

FIG. 6 is a bottom view of two antenna mounting assemblies 54 configured to secure the antenna 52 to the gimbal 48. Specifically, a first antenna mounting assembly 75 and a second mounting assembly 77 are illustrated. In each mounting assembly 75 and 77, the flat bracket 64 is secured to the washer bracket 58 by a pair of fasteners 62. Furthermore, the washer bracket 58 is secured to the gimbal bearing 48 by the fastener 56. With regard to the first mounting assembly 75, rotation of the washer bracket 58 in a direction 78 is blocked by contact between the dowel 60 and the bearing 48. Similarly, rotation of the washer bracket 58 of the second mounting assembly 77 in a direction 79 is blocked by contact between the dowel 60 and the bearing 48. Because each flat bracket 64 is rigidly secured to the antenna 52, rotation of the antenna 52 in either direction 78 or 79 is blocked, thereby rigidly securing the antenna 52 to the gimbal bearing 48.

In the present embodiment, the configuration of the washer bracket 58 is the same for both the first mounting assembly 75 and the second mounting assembly 77. As illustrated, the washer bracket 58 of the second assembly 77 is rotated in the direction 78 from the washer bracket 58 of the first assembly 75. Rotation of the washer bracket 58 varies the position of the openings 68 and 70 with respect to the bearing 48. Consequently, in the first assembly 75, the dowel 60 is inserted into the first opening 68 to achieve a desired angle between the first assembly 75 and the bearing 48. Similarly, in the second assembly 77, the dowel 60 is inserted into the second opening 70 to achieve a desired angle between the second assembly 77 and the bearing 48. In this manner, a common washer bracket may be employed for both the first and second antenna mounting assemblies 75 and 77, thereby reducing design and construction costs.

Employing an antenna mounting system that secures antennas 52 to bearings 48 using existing fasteners 56 obviates the addition of permanent mounting hardware. Consequently, antennas 52 may be secured to existing gimbals 38 quickly and without extensive modification. Such a configuration enables the present riser segment tracking and management system to be employed on rigs 24 which are already deployed on the sea. Furthermore, the illustrated mounting assembly configuration facilitates modular construction such that replacement antennas 52 and/or other antenna configurations may be readily secured to the gimbal 38.

Figure 7:
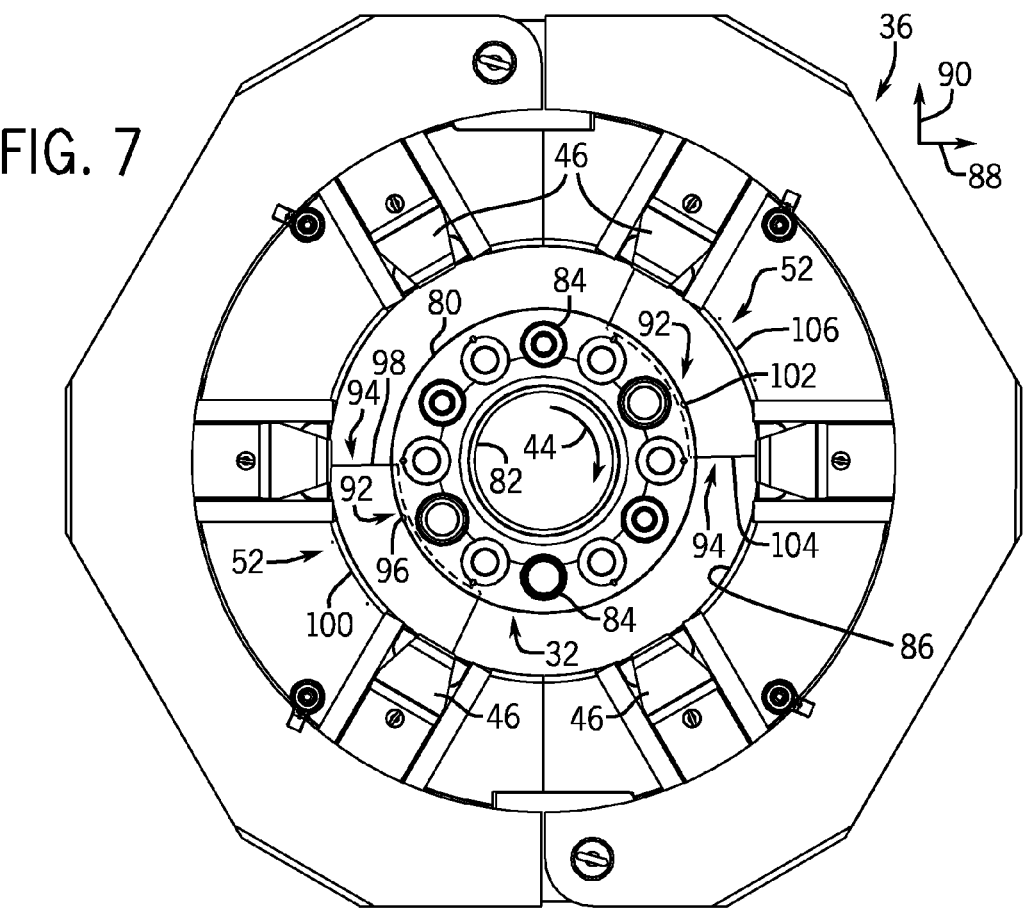
FIG. 7 is a top view of the spider and gimbal assembly, as shown in FIG. 2, including a riser segment disposed within a bore of the gimbal in accordance with certain embodiments of the present technique.

FIG. 7 is a top view of the spider and gimbal assembly, as shown in FIG. 2, including a riser segment 32 disposed within a bore of the gimbal 38. As illustrated, the riser segment 32 includes an outer casing 80, a main line 82, and auxiliary lines 84. As illustrated, a diameter of the main line 82 is larger than a diameter of each auxiliary line 84. The main line 82 may establish a passage from the rig to the well for providing tools, drilling fluids (e.g., mud), or any other substance or device during operation of the mineral extraction system 10. The auxiliary lines 84 may include choke lines, kill lines, hydraulic lines, glycol injection, mud return, and/or mud boost lines. For example, some of the auxiliary lines 84 may be coupled to the BOP 30 to provide choke and kill functions to the BOP 30.

As illustrated, the riser segment 32 is disposed within a bore 86 of the gimbal 38 and spider 36. As previously discussed, dogs 46 engage a flange 34 of the riser segment 32 to suspend the riser 22 from the platform 26 during assembly of the riser 22. As the platform or floating vessel 26 rotates and/or translates due to the motion of wind and/or waves, the riser segment 32 moves within the bore 86. Specifically, the riser segment 32 may translate in a horizontal direction 88 and/or a vertical direction 90. The directions 88 and 90 define an arbitrary two-dimensional coordinate system. As will be appreciated, coordinate system may be rotated about the axial direction 40 in alternative configurations.

As discussed in detail below, each riser segment 32 includes one or more transmitters (e.g. RFID tags) 92 configured to communicate with the antennas 52. While RFID tags 92 are referred to below, it will be appreciated that alternative embodiments may employ other transmitter configurations. As illustrated, two RFID tags 92 are positioned approximately 180 degrees apart along the circumferential direction 44 of the riser segment 32. In further embodiments, more or fewer tags 92 may be positioned along the circumference of the riser segment 32. For example, certain riser segments 32 may include 1, 2, 3, 4, 5, 6, 7, 8, 9, 10, or more tags 92 positioned about the circumference. In certain embodiments, additional RFID tags 92 may be positioned along the axial direction 40 of the riser segment 32. For example, 1, 2, 3, 4, 5, 6, 7, 8, or more sets of circumferentially positioned tags 92 may be positioned along a longitudinal axis (i.e., in the axial direction 40) of the riser segment 32. In the present configuration, the RFID tags 92 are disposed within a flange 34 of the riser segment 32. Certain embodiments may include RFID tags 92 disposed within one or both flanges 34 of each riser segment 32. In alternative embodiments, the RFID tags 92 may be disposed within a body of the riser segment 32.

As discussed in detail below, the arc shape of each antenna 52 establishes arcuate read ranges 94 within the bore 86. The read range 94 defines a range in which the antenna 52 will be able to receive a signal from the RFID tag 92. As will be appreciated, the antennas 52 may be able to read data from RFID tags 92 outside of the range 94. However, the read ranges 94 illustrates the minimum distance the antenna 52 will be able to receive RFID data from the tag 92.

As will be appreciated, the radial and circumferential extent of each read range 94 is defined by the antenna configuration and the frequency at which the antenna 52 and RFID tags 92 operate, among other factors. For example, in the present configuration, the RFID tags 92 and antennas are configured to operate in a low frequency band (i.e., approximately between 30 to 300 kHz). At such a frequency, the radial extent (i.e., range along radial direction 42) of the read range 94 may be approximately between 1 to 12, 4 to 10, 6 to 9, or about 9 inches. The circumferential and axial extent of the read range 94 may be defined by the circumferential and axial dimensions of the antenna 52. For example, in the present configuration, each antenna 52 may have an arc length (i.e., length along the circumferential direction 44) of approximately between 20 to 60, 25 to 40, 30 to 35, or about 32 inches. In addition, the axial extent (i.e., height in the axial direction 40) may be approximately between 5 to 12, 6 to 11, 7 to 10, or about 8 to 9 inches, in certain embodiments.

In the present embodiment, the RFID tags 92 and the antennas 52 are positioned such that at least one RFID tag 92 remains within a read range 94 of at least one antenna 52 regardless of riser segment position within the bore 86 of the gimbal/spider assembly. As illustrated, the riser segment 32 is substantially centered within the bore 86. In such a position, a first RFID tag 96 is positioned within a read range 98 of a first antenna 100. Similarly, a second RFID tag 102 is positioned within a read range 104 of a second antenna 106. In this configuration, each antenna 100 and 106 will be able to read the respective RFID tags 96 and 102. In the present embodiment, the antennas 52 are configured to establish read ranges 94 having a minimum radial and circumferential extent, while ensuring that at least one RFID tag 92 may be read regardless of riser segment position.

Figure 8:
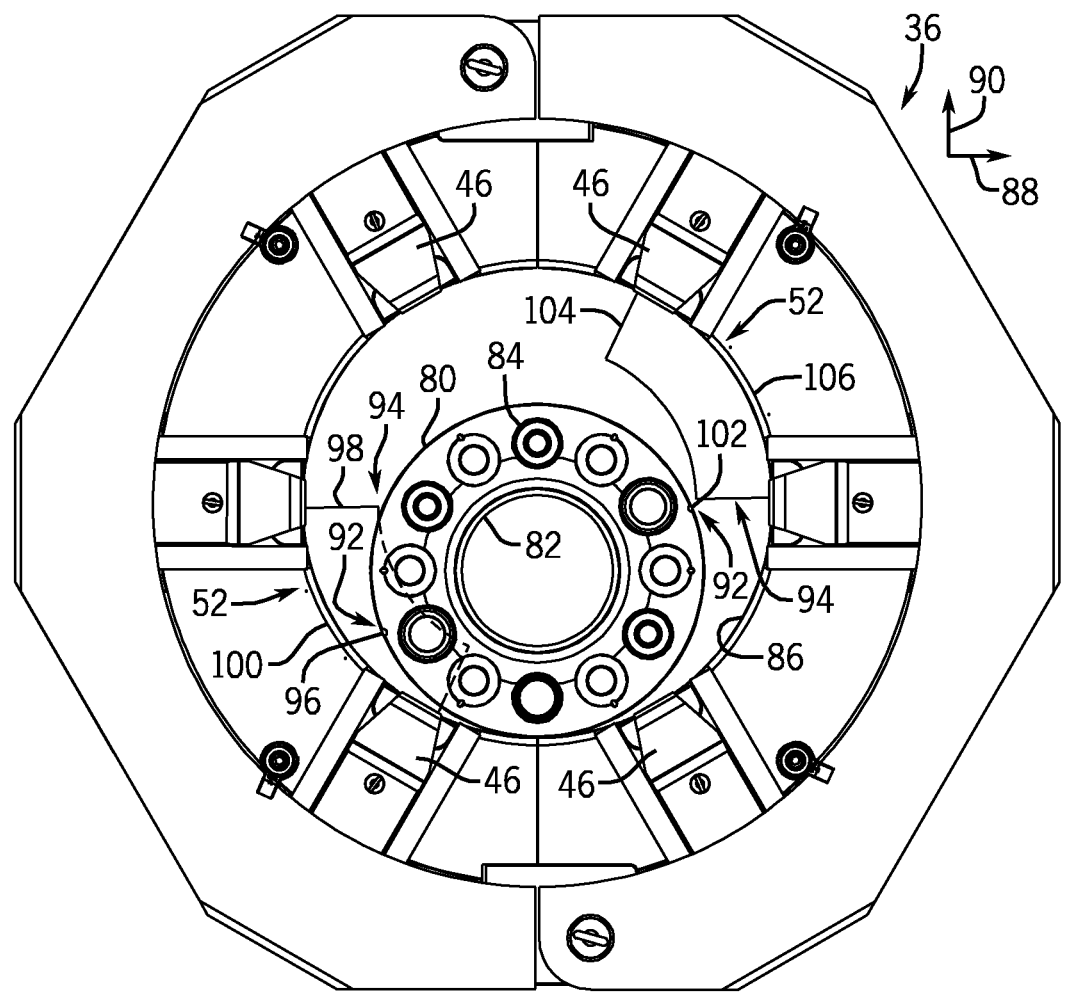
FIG. 8 is a top view of the spider and gimbal assembly, as shown in FIG. 2, in which the riser segment is positioned adjacent to a first circumferential side of the gimbal bore in accordance with certain embodiments of the present technique.

FIG. 8 is a top view of the spider and gimbal assembly, as shown in FIG. 2, in which the riser segment 32 is positioned adjacent to a first circumferential side of the gimbal bore 86. Specifically, the riser segment 32 is positioned at a maximum offset along the vertical axis 90. In this position, the second RFID tag 102 is outside of the read range 104 of the second antenna 106. Therefore, the second antenna 106 may not receive a signal from the second tag 102. However, the first tag 96 is within the read range 98 of the first antenna 100. Therefore, the first antenna 100 will receive a signal from the first tag 96. Similarly, if the riser segment 32 were offset at the opposite maximum bore position along the vertical axis 90, the second RFID tag 102 would be positioned within the read range 104 of the second antenna 106, and the first RFID tag 96 would be outside of the read range 98 of the first antenna 100. In such a position, the second antenna 106 would receive a signal from the second tag 102, but the first antenna 100 may not receive a signal from the first tag 96.

As discussed in detail below, each RFID tag 92 includes a unique code that is transmitted to the antenna 52 when the RFID tag 92 is within the read range 94. A table stored within a computer connected to the antennas 52 correlates each unique RFID tag code with a riser segment identification number. Therefore, if either tag 92 is read by either antenna 52, the computer will be able to identify which segment 32 is presently disposed within the bore 86. In this manner, riser segments 32 may be tracked regardless of bore position.

Figure 9:
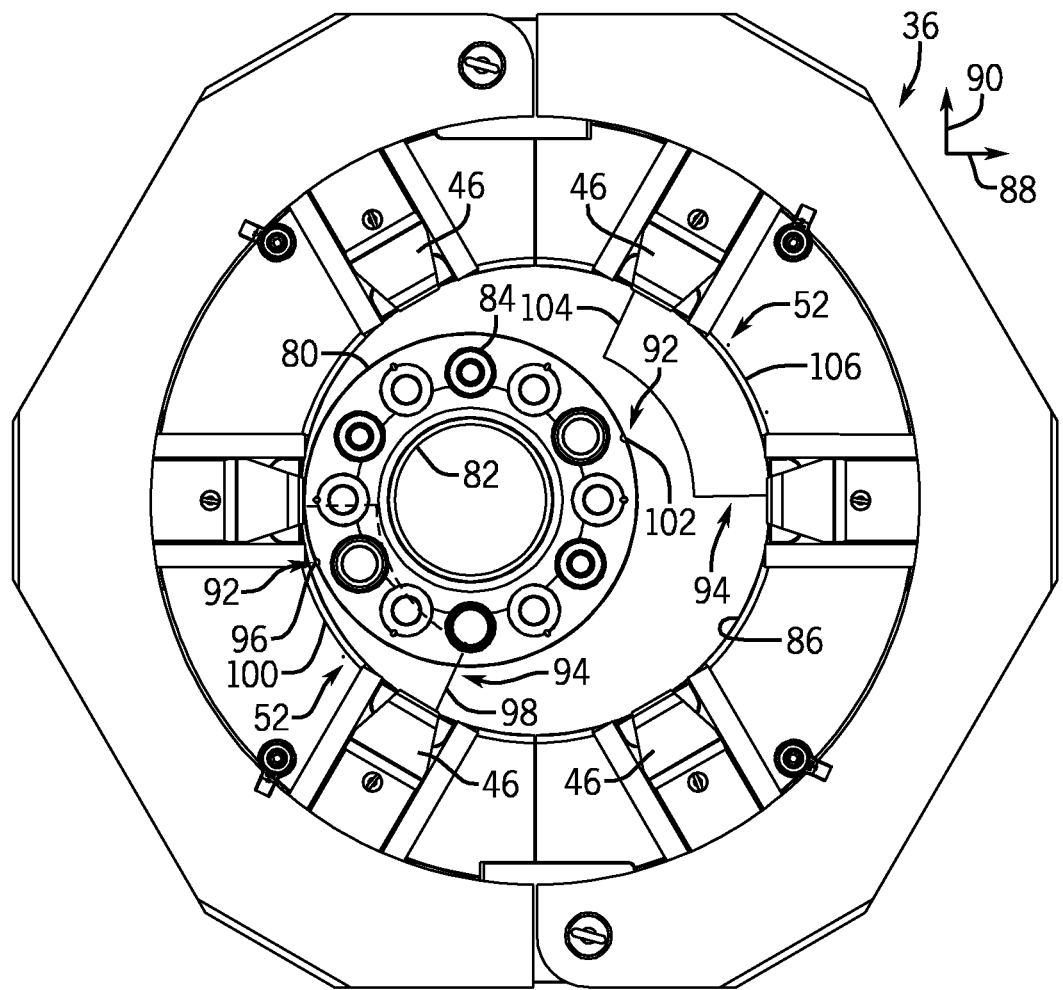
FIG. 9 is a top view of the spider and gimbal assembly, as shown in FIG. 2, in which the riser segment is positioned adjacent to a second circumferential side of the gimbal bore in accordance with certain embodiments of the present technique.

FIG. 9 is a top view of the spider and gimbal assembly, as shown in FIG. 2, in which the riser segment 32 is positioned adjacent to a second circumferential side of the gimbal bore 86. Specifically, the riser segment 32 is positioned at a maximum offset along the horizontal axis 88. In this position, the second RFID tag 102 is outside of the read range 104 of the second antenna 106. Therefore, the second antenna 106 may not receive a signal from the second tag 102. However, the first tag 96 is within the read range 98 of the first antenna 100. Therefore, the first antenna 100 will receive a signal from the first tag 96. Similarly, if the riser segment 32 were offset at the opposite maximum bore position along the horizontal axis 88, the second RFID tag 102 would be positioned within the read range 104 of the second antenna 106, and the first RFID tag 96 would be outside of the read range 98 of the first antenna 100. In such a position, the second antenna 106 would receive a signal from the second tag 102, but the first antenna 100 may not receive a signal from the first tag 96.

As a result of the established read ranges 94, at least one RFID tag 92 is within the read range 94 of at least one antenna 52 throughout the range of motion of the riser segment 32 within the bore 86 of the gimbal/spider assembly in both the horizontal direction 88 and the vertical direction 90. This configuration facilitates riser segment identification regardless of riser position relative to the gimbal 38 or spider 36. Consequently, riser segments 32 may be accurately tracked during deployment of the riser.

Figure 10:
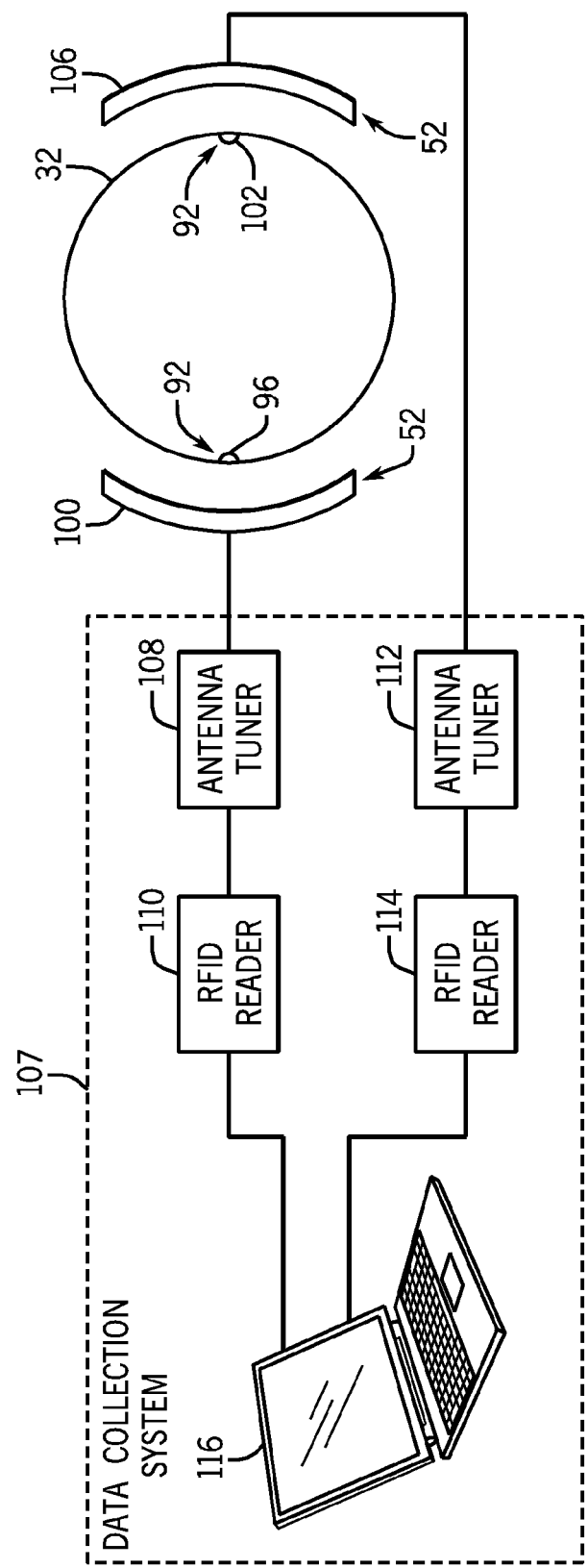
FIG. 10 is a block diagram of a system configured to receive information from RFID tags embedded within a riser segment in accordance with certain embodiments of the present technique.

FIG. 10 is a block diagram of a system configured to receive information from RFID tags 92 embedded within the riser segment 32. As previously discussed, when the riser segment 32 is disposed within the bore 86 of the gimbal 38, the first RFID tag 96 is positioned adjacent to the first antenna 100, and the second RFID tag 102 is positioned adjacent to the second antenna 106. When the first RFID tag 96 is within range of the first antenna 100, the first antenna 100 receives a signal from the first RFID tag 96. Similarly, when the second RFID tag 102 is within range of the second antenna 106, the second antenna 106 receives a signal from the second RFID tag 102.

As will be appreciated, RFID tags 92 include an antenna and a circuit. The antenna is both a receiving antenna and a transmitting antenna, designed to resonate at a particular frequency. Electrical energy is transferred from the antenna 52 to the RFID tag 92 via a power/interrogation signal which is received by the RFID tag antenna and serves to power the circuit. As discussed in detail below, the circuit holds a small amount of coded information, such as identification data, manufacture date, part number, etc. Certain embodiments employ a "passive" circuit which does not have an independent power source and does not initiate transfer of information except in response to the signal from the antenna 52. The power/interrogation signal from the antenna 52 will power the circuit and cause the circuit to generate a control signal encoded with the data stored in the circuit.

In the present configuration, each antenna 100 and 106 is electrically coupled to a data collection system 107 which automatically reads and stores data from the RFID tags 92. Specifically, the antenna 100 is electrically coupled to an antenna tuner 108. As will be appreciated by those skilled in the art, to transfer energy from the antenna 100 to the RFID tag 96 efficiently, the antenna 100 may be tuned to the resonant frequency of the RFID tag 96. Specifically, the inductance of the antenna 100 may be selected to match the inductance of the RFID tag 96 and the metallic environment. Therefore, the antenna tuner 108 alters electromagnetic properties of the antenna 100 to properly communicate with the RFID tag 96.

The antenna tuner 108 is electrically or magnetically coupled to an RFID reader 110. The RFID reader 110 both provides the power/interrogation signal to the antenna 52, and receives RFID tag information from the antenna 52. For example, in certain configurations, each RFID tag 92 is encoded with a unique identification number. When the RFID tag 92 receives the power/interrogation signal, the tag 92 may transmit a reply signal indicative of the unique identification number. The RFID reader 110 may then convert this signal into a digital representation of the unique identification number for the particular RFID tag 92. As discussed in detail below, the tag identification number may serve to uniquely identify a particular riser segment 32.

As illustrated, a second antenna tuner 112 is electrically or magnetically coupled to the second antenna 106, and a second RFID reader 114 is electrically or magnetically coupled to the second antenna tuner 112. As will be appreciated, alternative embodiments may include a single antenna tuner 108 and/or a single RFID reader 110 configured to operate both antennas 100 and 106. In the present configuration, the first RFID reader 110 and the second RFID reader 114 are communicatively coupled to a data processing unit, such as the illustrated computer 116. The computer 116 is configured to receive tag identification data from the first RFID tag 96 and/or the second RFID tag 102 to uniquely identify a particular riser 32.

Figure 11:
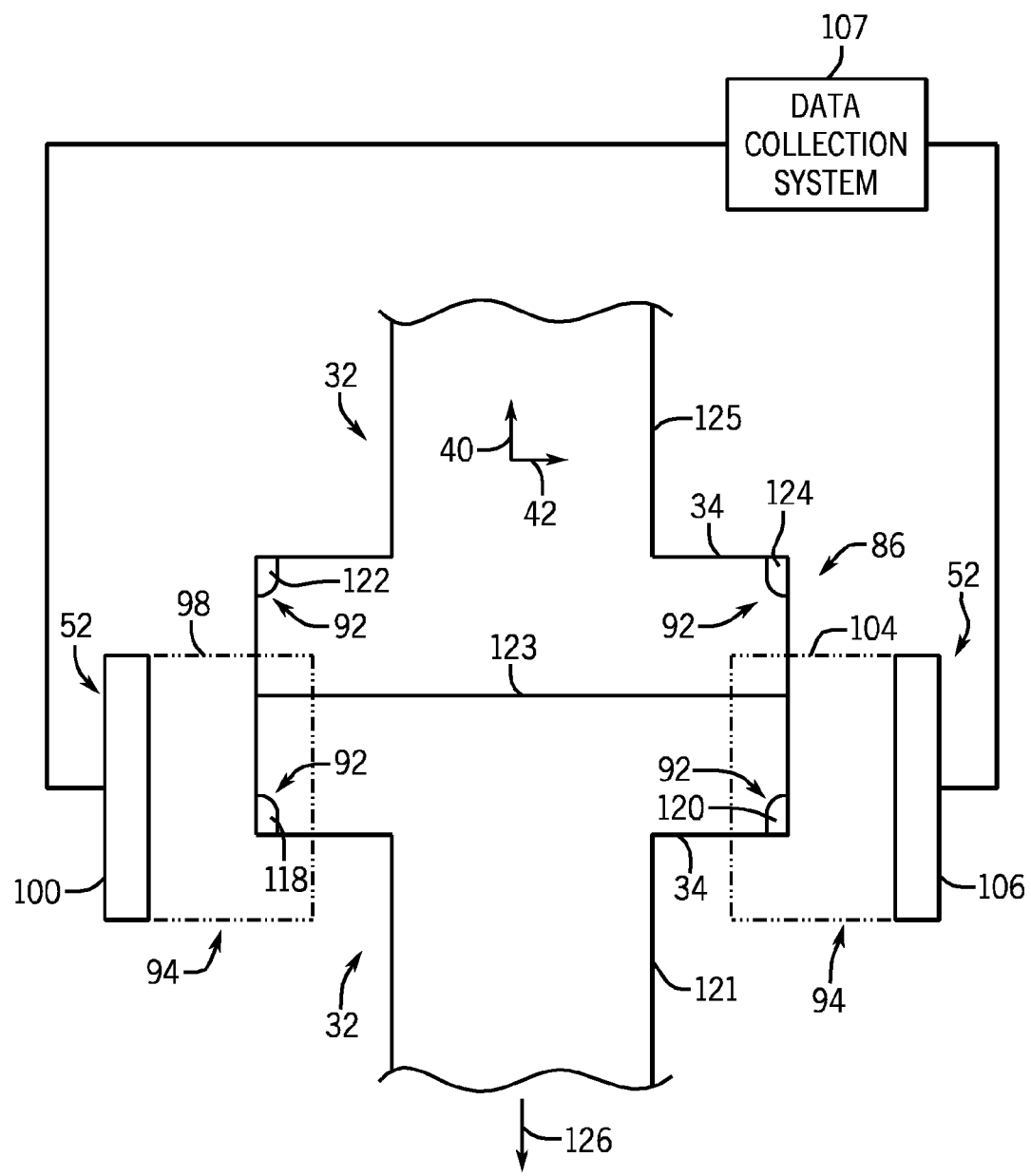
FIG. 11 is a block diagram of two connected riser segments passing through read ranges of antennas in accordance with certain embodiments of the present technique.

FIG. 11 is a block diagram of two connected riser segments 32 passing through the read ranges 94 of the antennas 52. In the present embodiment, a first RFID tag 118 and a second RFID tag 120 are coupled to a first riser segment 121. As illustrated, both RFID tags 118 and 120 are disposed within the flange 34 of the first riser segment 121. Specifically, each RFID tag 118 and 120 is disposed at an outer radial extent (i.e., along the radial direction 42) of the flange 34, and at an axial position (i.e., along the axial direction 40) away from an interface surface 123 between riser segments 32. In alternative embodiments, the RFID tags 118 and 120 may be positioned at an axial position adjacent to the interface surface 123. Furthermore, the first riser segment 121 includes a second pair of RFID tags 92 (not shown) disposed within a flange 34 at the opposite axial end of the riser segment 121. In this configuration, each riser segment 32 includes a total of four RFID tags 92.

A second riser segment 125, coupled to the first riser segment 121 at the interface surface 123, includes a first RFID tag 122 and a second RFID tag 124. Similar to the RFID tags within the first riser segment 121, each RFID tag 122 and 124 is disposed within the flange 34 at an outer radial extent of the flange 34, and at an axial position away from the interface surface 123. The second riser segment 125 also includes at second pair of RFID tags (not shown) disposed within a flange 34 at the opposite axial end of the riser segment 125. Having tags within both flanges 34 reduces the possibility that the data collection system 107 will not identify a riser segment 32 as the riser 22 is assembled.

As previously discussed, the riser 22 is constructed by successively lowering riser segments 32 downwardly (i.e., in a direction 126) toward a wellhead 12. As the flange 34 of each riser segment 32 passes through the bore 86 of the spider/gimbal assembly, one or both of the RFID tags 92 within each flange 34 will pass through the read ranges 94 of the antennas 52. As illustrated, in the present position of the riser segments 121 and 125, the first RFID tag 118 of the first riser segment 121 is within the read range 98 of the first antenna 100, and the second RFID tag 120 of the first riser segment 121 is within the read range 104 of the second antenna 106. As previously discussed, if the riser segment 121 is offset in the radial direction 42 relative to the bore 86, only one RFID tag 118 or 120 may be within the read range 98 or 104 of the antennas 52. Furthermore, as illustrated, the first RFID tag 122 of the second riser segment 125 is outside of the read range 98 of the first antenna 100, and the second RFID tag 124 of the second riser segment 125 is outside of the read range 104 of the second antenna 106. Therefore, in the present riser position, the data collection system 107 will receive RFID information from the RFID tags 118 and 120 of the first riser 121, but not from the RFID tags 122 and 124 of the second riser 125.

However, as the riser segments 32 continue to move in the downward direction 126, RFID tags 92 of both riser segments 121 and 125 will enter the read ranges 94 of the antennas 52. For example, if the riser segments 32 are centered within the bore 86, RFID tags 118 and 122 will enter the read range 98 of the first antenna, and RFID tags 120 and 124 will enter the read range 104 of the second antenna 106. As will be appreciated by those skilled in the art, if two RFID antennas 92 are within a single read range 94, the data collection system 107 may not be able to receive RFID information from either tag 92. Consequently, the data collection system 107 may record no RFID tag information during the period when both RFID tags 118 and 122 are within the first read range 98, and when both RFID tags 120 and 124 are within the second read range 104.

As the riser segments 32 move farther in the downward direction 126, the RFID tags 118 and 120 of the first riser segment 121 will exit the read ranges 94. At that point, the first RFID tag 122 of the second riser segment 125 will be positioned within the read range 98 of the first antenna 100, and the second RFID tag 124 of the second riser segment 125 will be positioned within the read range 104 of the second antenna 106. Consequently, the data collection system 107 will be able to receive RFID tag information from the RFID tags 122 and 124 of the second riser segment 125. In this manner, both the first and second riser segments 121 and 125 will be detected as they pass through the gimbal/spider assembly.

As previously discussed, each RFID tag 92 contains a circuit which stores a unique identification number. For example, in the present embodiment, each RFID tag 92 includes a 64 bit identification number. As will be appreciated, more than $18 \times 10^{18}$ possible identification numbers exist within a set of 64 bit numbers. Therefore, there is effectively no limit to the number of RFID tags 92 that may be employed in the present configuration. In alternative embodiments, 16 bit, 32 bit, 128 bit, or more, identification numbers may be utilized. The data collection system 107 may include a table that associates the tag identification number with a particular riser. An example table is listed below.

TABLE 1

|  | First Riser Segment 121 | Second Riser Segment 125 |
| --- | --- | --- |
| RFID Tag 1 | 1 | 5 |
| RFID Tag 2 | 2 | 6 |
| RFID Tag 3 | 3 | 7 |
| RFID Tag 4 | 4 | 8 |

As will be appreciated, every riser segment 32 within an inventory may be included within the table. As will be further appreciated, embodiments including more than four RFID tags 92 per riser segment 32 will include additional rows for associating the additional tags 92 with each riser segment 32. In the present embodiments, "RFID Tag 1" and "RFID Tag 2" may correspond to the RFID tags 92 within a first flange 34, and "RFID Tag 3" and "RFID Tag 4" may correspond to tags 92 within a second flange 34. For example, the first RFID tag 118 of the first riser segment 121 may be designated as "RFID Tag 1," and the second RFID tag 120 of the first riser segment 121 may be designated as "RFID Tag 2." Consequently, the unique identification number of RFID tag 118 is 1, and the unique identification number of RFID tag 120 is 2. Similarly, the first RFID tag 122 of the second riser segment 125 may be designated as "RFID Tag 3," and the second RFID tag 124 of the second riser segment 125 may be designated as "RFID Tag 4." In such an arrangement, the unique identification number of RFID tag 122 is 7, and the unique identification number of RFID tag 124 is 8. In this configuration, if the data collection system 107 receives an RFID identification number of 1 or 2, the data collection system 107 records that the first riser segment 121 has passed through the bore 86. Similarly, if the data collection system 107 receives an RFID identification number of 7 or 8, the data collection system 107 records that the second riser segment 125 has passed through the bore 86.

While the numbers 1 through 8 have been listed as RFID identification numbers, it will be appreciated that identification numbers in the present embodiment may be significantly longer (e.g., 64 bit) numbers. Furthermore, while the table identifies the riser segments 32 as the first riser segment 121 and the second riser segment 125, it should be appreciated that the present embodiment may identify riser segments 32 by unique identification numbers. In certain embodiments, the computer 116 may store a table correlating RFID identification numbers to riser identification numbers. As will be appreciated, such a table may utilize significant storage space within the computer 116 of the data collection system 107.

In addition, the computer 116 may be configured to filter the data received from the RFID tags 92 to properly identify each riser segment 32 as it passes through the bore 86. As previously discussed, each riser segment 32 may include a pair of RFID tags 92 disposed within each flange 34. Consequently, the data collection system 107 may read up to four or more tags, each identifying the same riser segment 32. Therefore, the computer 116 may be configured to only record the presence of a particular rise segment 32 within the bore 86 once. For example, each time the data collection system 107 identifies a riser segment 32 based on receiving a unique identification number from an RFID tag 92, a record indicating that the riser segment 32 passed through the bore 86 may be stored. As subsequent RFID tags 92 associated with the identified riser segment 32 pass through the bore 86, the data collection system 107 may overwrite the previous record with a new record indicating that the riser segment 32 passed through the bore 86. In this manner, only one record for each riser segment 32 is stored in the computer 116.

Furthermore, the data collection system 107 may be configured to filter data received by the multiple antennas 52. For example, as illustrated, both the first and second RFID tags 118 and 120 of the first riser segment 121 are within the read ranges 94 of the antennas 52. As previously discussed, the RFID reader 110 may convert the signal from the first RFID tag 118 into an RFID identification number and send the number to the computer 116. At substantially the same time, the RFID reader 114 may convert the signal from the second RFID tag 120 into an RFID identification number and send the number to the computer 116. As a result, the computer 116 may receive two unique RFID numbers at substantially the same time. Consequently, the computer 116 may be configured to correlate both RFID numbers with the first riser segment 121, and only store one record of the riser segment 121.

By way of example, the following table lists RFID identification information, as received by the computer 116, for the illustrated configuration. Specifically, the table represents data starting at the illustrated riser position and continuing as the riser 22 moves downwardly in the direction 126. As will be appreciated, the time steps may vary depending on the capability of the electronic components within the data collection system 107, speed of the riser 22 in the direction 126 and/or desired sample frequency. For example, in certain embodiments, the data collection system 107 may read RFID information at a rate of 1 Hz, 2 Hz, 5 Hz, 10 Hz, 15 Hz, 20 Hz, or more. By further example, the sample rate may be between approximately 1 to 30 Hz, 2 to 20 Hz, 5 to 15 Hz, or about 10 Hz.

TABLE 2

| Time Step | RFID Identification Number From First Antenna 100 | RFID Identification Number From Second Antenna 106 |
|---|---|---|
| 1 | 1 | 2 |
| 2 | 1 | 2 |
| 3 | No Data | No Data |
| 4 | No Data | No Data |
| 5 | 7 | 8 |
| 6 | 7 | 8 |

Starting at the first time step, the data collection system 107 will access the data in Table 1 and correlate the RFID identification numbers, 1 and 2, received from the first and second antennas 100 and 106, respectively. Because Table 1 indicates that RFID tags 92 having identification numbers 1 and 2 are associated with the first riser segment 121, the data collection system 107 will store a record of the first riser segment 121 passing through the bore 86. At the second time step, the data collection system 107 will again identify the first riser segment 121 and overwrite the previous record with a new recording indicating the presence of the first riser segment 121. At time steps 3 and 4, the data collection system 107 may receive no data because both RFID tags 118 and 112 are within the first read range 98, and both RFID tags 120 and 124 are within the second read range 104. At time step 5, the RFID tags 118 and 120 of the first riser segment 121 have moved outside of the read ranges 98 and 104. Consequently, the data collection system 107 will record that the second riser segment 125 has passed through the bore 86. Specifically, based on Table 1, the data collection system 107 will associate the detected RFID tags 92 having identification numbers 7 and 8 with the second riser segment 125, and store a record of the second riser segment 125 passing through the bore 86. At time step 6, the data collection system will again detect the presence of the second riser segment 125 in the bore 86, and overwrite the prior record. In this manner, only one record of the first riser segment 121 passing through the bore 86 and the second riser segment 125 passing through the bore 86 will be stored in the computer 116.

In addition, the computer 116 will store the order that riser segments pass through the bore 86 of the gimbal/spider assembly. In this manner, the lifecycle of the riser segments 32 may be monitored and managed. As will be appreciated, the stress on a riser segment 32 is related to the depth at which the riser segment 32 is positioned beneath the sea. Specifically, riser segments 32 located at greater depth will experience a higher stress than riser segments 32 located at shallower depths. The higher stress may result in increased wear on the riser segment 32. Consequently, riser segments 32 may be "rotated" from lower depth positions to shallower depth positions throughout the lifetime of the riser segment 32. In this manner, the average useful life of the riser segments 32 may be extended, thereby reducing drilling costs.

By monitoring the order that riser segments 32 pass through the bore 86, the depth and duration at a particular depth of each riser segment 32 may be recorded. Specifically, riser segments 32 may be approximately between 80 to 100 feet long. The exact length of each riser segment 32 may be stored in the computer 116, either as part of the RFID tag identification table or a separate database. As each riser segment 32 is connected to the riser 22, the depth of a particular riser segment 32 may be computed by summing the lengths of the subsequently attached segments 32. Furthermore, the present embodiment may track riser segments 32 as they are extracted from the water in a similar manner to the process described above. The time of extraction may be subtracted from the time the riser segment 32 was deployed. In this manner, both the depth and duration at the depth of each riser segment 32 may be automatically monitored and recorded, thereby facilitating proper rotation of riser segments 32 throughout their operational life.

In addition, the data collection system 107 may track the inventory of riser segments 32 aboard the rig 24. For example, as each riser segment 32 is loaded onto the rig 24, an inventory database may be updated with the unique identification number of each loaded segment 32. In certain embodiments, a handheld reader may be employed to read the RFID tag 92 of each segment 32 to determine the unique identification number. As each riser segment 32 is lowered through the bore 86 of the gimbal/spider assembly, the unique identification number of the segment 32 will be removed from the inventory database and added to a run-riser segment database. Conversely, as each riser segment 32 is extracted from the water, the unique identification number of the segment 32 will be removed from the run-riser segment database and added to the inventory database. Such a configuration may facilitate automatic tracking of deployed riser segments and inventory aboard the rig 24.

Figure 12:
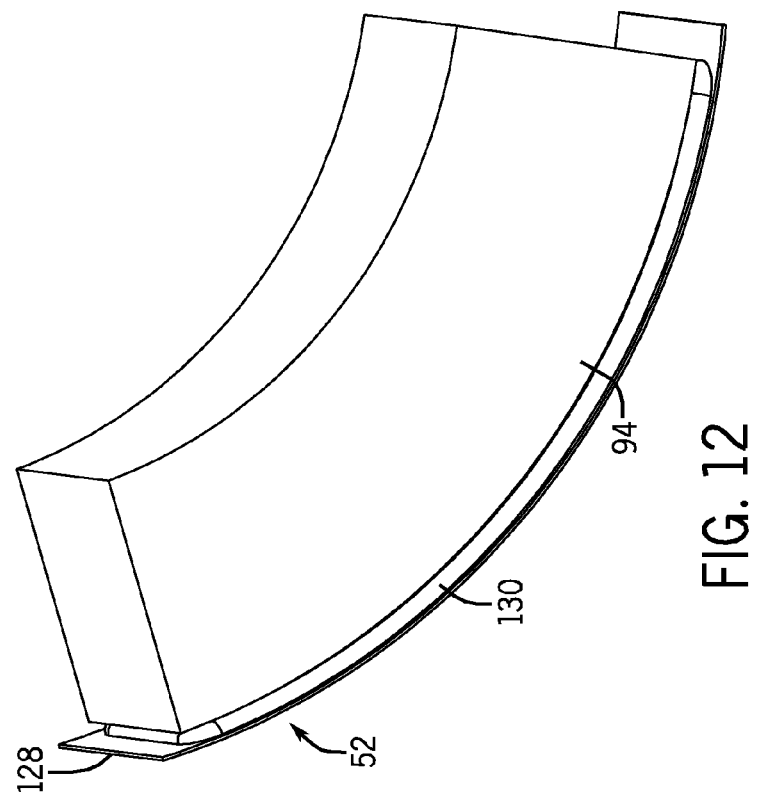
FIG. 12 is a top view of the arc antenna, as shown in FIG. 2, in accordance with certain embodiments of the present technique.

FIG. 12 is a top view of an embodiment of the antenna 52, as shown in FIG. 2. As previously discussed, the antenna 52 is arc-shaped to establish an arc-shaped read range 94. In the present embodiment, the antenna 52 is configured to communicate with low frequency RFID tags 92. As will be appreciated, RFID tags 92 may transmit within a variety of frequency ranges. For example, RFID tags 92 that operate within a frequency range of approximately between 30 to 300 kHz are generally considered low frequency, RFID tags 92 that operate within a frequency range of approximately between 3 to 30 MHz are generally considered high frequency, and RFID tags 92 that operate within a frequency range of approximately between 0.3 to 3 GHz are generally considered ultra high frequency.

Each operating frequency has particular advantages and disadvantages. Specifically, low frequency RFID tags (i.e., tags operating at a frequency approximately between 30 to 300 kHz) have the ability to transmit through materials that would block high frequency and/or ultra high frequency transmissions. In the present application, an RFID tag 92 may be secured to the riser segment 32 prior to priming and painting the segment 32. Therefore, the RFID tag 92 may be coated with one or more layers of primer and paint. Such coatings may interfere within high frequency and/or ultra high frequency transmissions. Furthermore, the riser segments 32 are exposed to various contaminants on the rig 24. For example, drilling mud, grease, or other material may build up on the riser segments 32 and the RFID tags 92. Such materials may further interfere with high frequency and/or ultra high frequency transmissions. Consequently, the present embodiment may employ low frequency RFID tags 92 which emit a signal that may penetrate the primer, paint, drilling mud, grease, or other materials. For example, the present embodiment may employ RFID tags 92 that operate within a frequency range of approximately between 30 to 300, 50 to 250, 75 to 200, 100 to 150, or about 125 kHz. Such frequency ranges may be particularly suited for the drilling environment.

Unfortunately, the range of low frequency RFID tags 92 may be limited compared to the range of higher frequency transmitters. Depending on the receiving antenna configuration, the range may be approximately between 1 to 12 inches. Due to the limited range, conventional antenna configurations may be ineffective at detecting the RFID tags 92 within the bore 86 of the gimbal 38 and/or spider 36. Consequently, the present embodiment employs an arcuate antenna 52 configured to establish an arc-shaped read range 94. As previously discussed, placing two such antennas 52 on opposite sides of the bore 86 may communicate with at least one RFID tag 92 regardless of riser segment position within the bore 86.

As illustrated, the antenna 52 includes an arcuate plate 128 including a recess 130 disposed about a perimeter of the plate 128. As discussed in detail below, a coil of conductive wire is disposed within the recess 130, and configured to receive a signal from the RFID tag 92. The arcuate plate 128 may be constructed from a variety of suitable materials. The particular material may be selected such that the arcuate plate 128 does not interfere with the signal from the RFID tag 92. For example, the arcuate plate 128 may be molded from a thermoplastic, such as ABS, acrylic, PEEK, polyester, or other suitable thermoplastic. In one embodiment, the arcuate plate 128 is molded from an acrylic-polyvinyl chloride thermoplastic. This particular material may be well suited for use in the drilling environment because of its chemical resistance properties.

Figure 13:
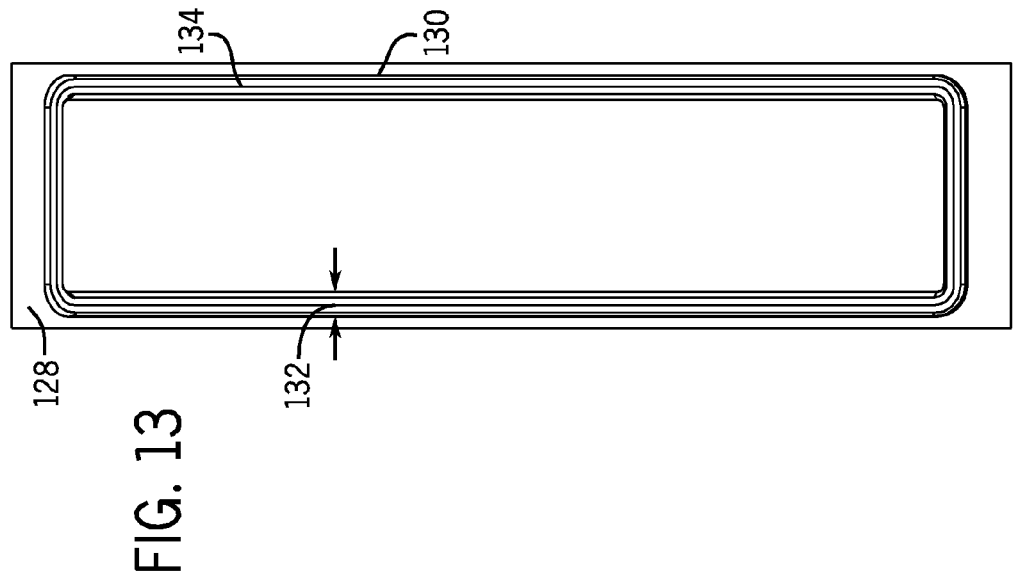
FIG. 13 is a front view of the arc antenna, as shown in FIG. 2, in accordance with certain embodiments of the present technique.

FIG. 13 is a front view of an embodiment of the antenna 52, as shown in FIG. 2. As illustrated, the recess 130 extends about the perimeter of the arcuate plate 128. A width 132 of the recess 130 may be selected to accommodate a coil of conductive wire 134 which serves as the receiving and/or transmitting element of the antenna 52. The conductive wire 134 may be composed of any suitable material, such as copper, for example. Furthermore, the thickness of the wire 134 may be particularly selected to enhance the read range 94 of the antenna 52. As illustrated, the conductive wire 134 extends along the recess 130 to establish three turns, i.e., three complete revolutions about the perimeter. As will be appreciated, the number of turns may be selected based on the inductance of the RFID tag 92. For example, when selecting the number of turns for the conductive wire 130, an RFID tag 92 may be placed within the read range 94 of the antenna 52. The number of turns may then be adjusted to match the inductance of the RFID tag 92. In this manner, the antenna 52 may be coarsely "tuned" to match the particular RFID tags 92 employed in a particular application.

Once the proper number of turns of the conductive wire 134 has been established, the conductive wire 134 may be secured within the recess 130 of the antenna 52. For example, an adhesive may be employed to couple the wire 134 to the recess 130 of the arcuate plate 128. In certain embodiments, the conductive wire 134 may be first placed within the recess 130. A liquid resin (e.g., polyester, vinylester, epoxy, etc.) may then be poured into the recess 130 over the conductive wire 134. When the resin hardens, the wire 134 will be permanently secured within the recess 130 of the antenna 52. The completed antenna 52 may then be secured to the gimbal 38 by the previously described antenna mounting assembly 54. Employing such arcuate antennas 52 may facilitate detection of RFID tags 92 within the bore 86 of the gimbal/spider assembly regardless of riser segment position.

Figure 14:
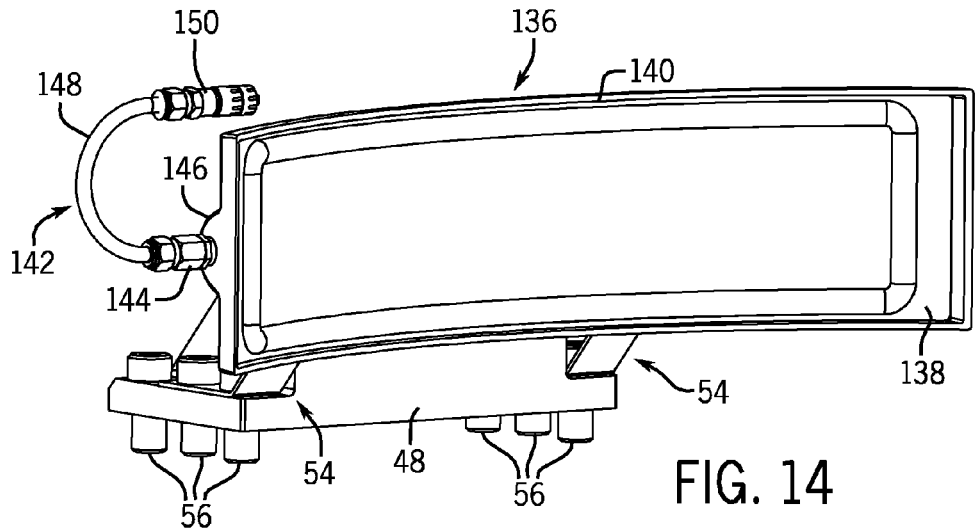
FIG. 14 is a perspective view of an alternative embodiment of an arc antenna in which the arc antenna includes a two-piece structure.

FIG. 14 is a perspective view of an alternative embodiment of an arc antenna 136 in which the arc antenna 136 includes a two-piece structure. As illustrated, the arc antenna 136 includes an arcuate plate 138 configured to accommodate a coil of conductive wire 134, similar to the arcuate plate 128 described above with reference to FIGS. 12 and 13. The arc antenna 136 also includes an arcuate housing 140 coupled to the arcuate plate 138 and configured to substantially enclose the conductive wire 134. As discussed in detail below, the arcuate housing 140 is also configured to interface with the antenna mounting assembly 54, thereby securing the arc antenna 136 to the bearing 48.

As illustrated, a cable assembly 142 is coupled to the arcuate housing 140 and configured to communicatively couple the conductive wire 134 to the data collection system 107. The cable assembly 142 includes a first connector 144 coupled to a protrusion 146 of the arcuate housing 140. The first connector 144 is configured to establish a connection between the conductive wire 134 and a cable 148 extending to a second connector 150. The second connector 150 may be directly connected to the data collection system 107, or connected to a second cable assembly extending to the data collection system 107. In this manner, a communicative coupling may be established between the arc antenna 136 and the data collection system 107.

Figure 15:
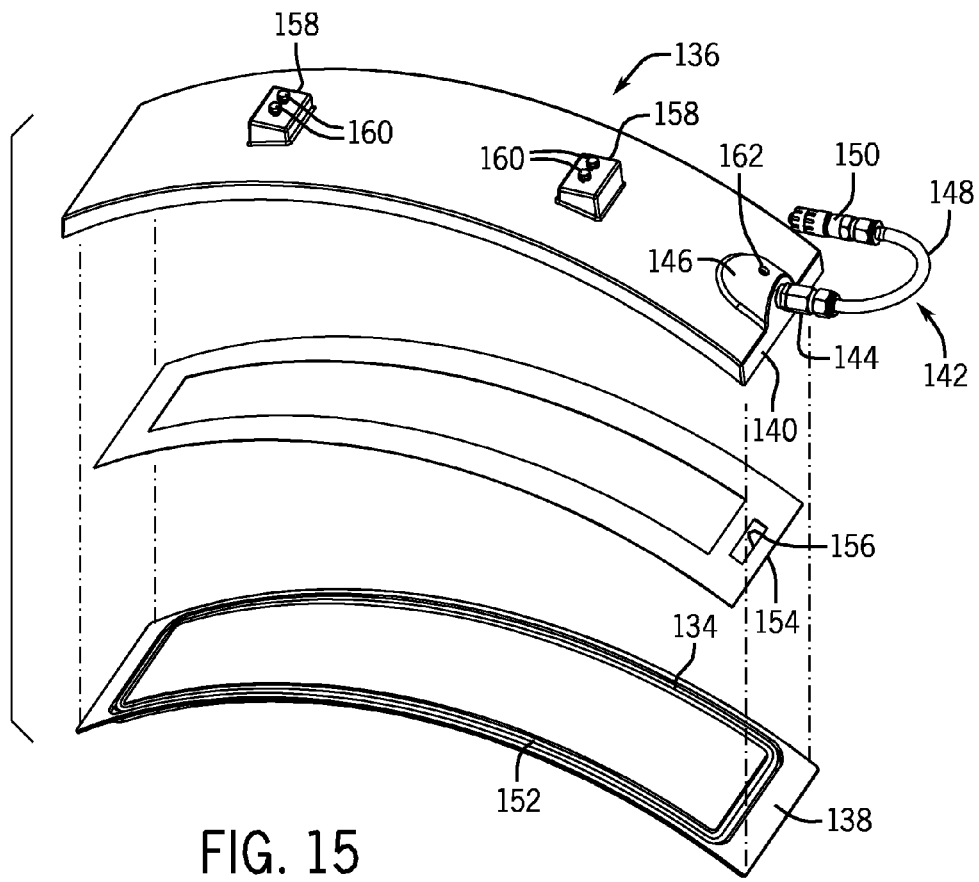
FIG. 15 is an exploded view of the two-piece antenna structure, as shown in FIG. 14, including an arcuate plate and an arcuate housing.

FIG. 15 is an exploded view of the two-piece antenna 136, as shown in FIG. 14, including the arcuate plate 138 and the arcuate housing 140. Similar to the arcuate plate 128 described above with reference to FIGS. 12 and 13, the illustrated arcuate plate 138 includes a recess 152 configured to accommodate a coil of the conductive wire 134. As illustrated, the recess 152 extends about the perimeter of the arcuate plate 138 to maximize a diameter of the wire coil. The arc antenna 136 also includes an adhesive strip, such as the illustrated double-sided tape 154, configured to secure the arcuate plate 138 to the arcuate housing 140. In certain embodiments, the double-sided tape 154 includes an adhesive layer (e.g., an air-activated acrylic adhesive layer) disposed on each side of a foam substrate. In such embodiments, the double-sided tape 154 may be sandwiched between the arcuate plate 138 and the arcuate housing 140, thereby establishing a bond between each adhesive layer and a respective element of the antenna 136. As will be appreciated, certain adhesives may cure or harden over an extended period of time. Therefore, spring clamps may be employed to secure the arcuate plate 138 to the arcuate housing 140 during the curing/hardening period.

As will be appreciated, various other techniques may be employed to secure the arcuate plate 138 to the arcuate housing 140. For example, in certain embodiments, an adhesive may be applied to an inner surface of the plate 138 and/or the housing 140, thereby establishing a bond when the components are assembled. In further embodiments, a bead of sealant (e.g., caulk, glue, etc.) may be disposed about the perimeter of the arcuate plate 138 to couple the plate 138 to the housing 140 and/or to provide a seal to substantially block contaminants (e.g., dirt, oil, mud, water, etc.) from entering an interior of the antenna 136. In addition, fasteners may be employed to couple the arcuate plate 138 to the arcuate housing 140. As will be appreciated, multiple coupling techniques may be utilized in combination to provide an enhanced connection between the arcuate plate 138 and the arcuate housing 140. For example, in certain embodiments, the double-sided tape 154 may be utilized in conjunction with a caulk bead to secure the arcuate plate 138 to the arcuate housing 140. Because the arcuate housing 140 is positioned adjacent to the recess 152, the housing 140 serves to substantially enclose the recess 152, thereby limiting movement of the conductive wire 134.

As discussed in detail below, the arcuate housing 140 includes protrusions 158 configured to interface with mounting brackets. For example, the antenna mounting assembly 54 may be secured to the protrusions 158 via fasteners, such as the illustrated bolts 160, thereby coupling the arc antenna 136 to the gimbal bearing 48. As previously discussed, the arcuate housing 140 includes another protrusion 146 configured to support the cable assembly 142. As illustrated, the protrusion 146 includes an opening 162 configured to receive a flow of resin. Similar to the configuration described above with reference to FIGS. 12 and 13, the resin may be employed to secure the conductive wire 134 to the recess 152. To facilitate the flow of resin from the opening 162 to the recess 152, the double-sided tape 154 includes an opening 156 positioned adjacent to the recess 152 and the opening 162. Consequently, liquid resin may pass through the opening 156 and into the recess 152, thereby securing the conductive wire 134 to the arcuate plate 138.

Figure 16:
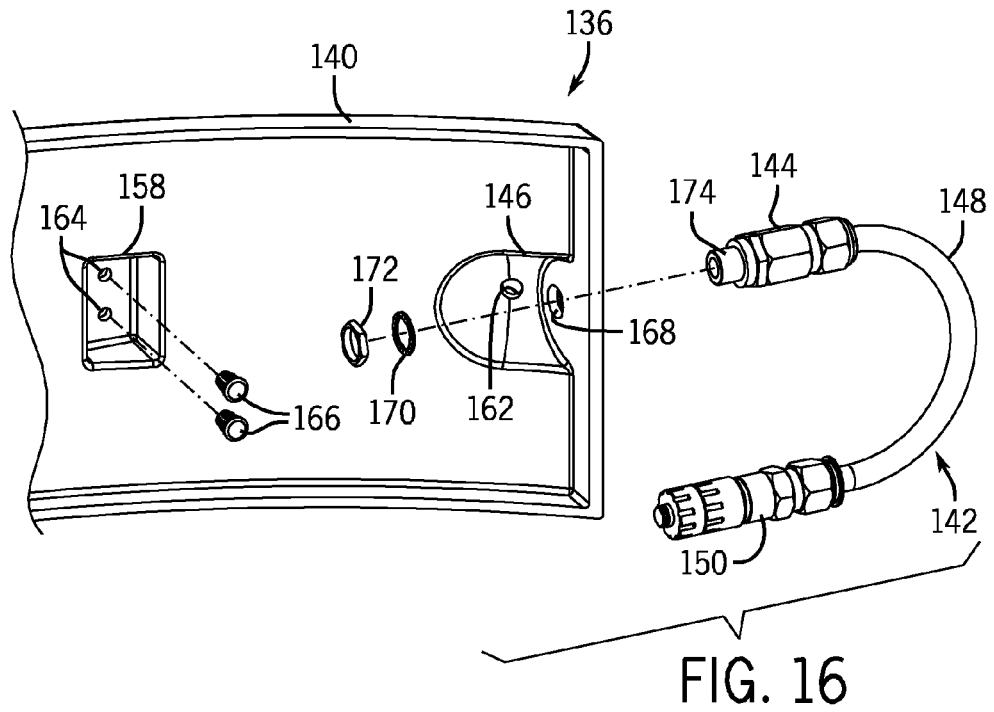
FIG. 16 is an exploded view of the arcuate housing, as shown in FIG. 15, including inserts for coupling the arcuate housing to a bracket, and a fastener for securing a cable assembly.

FIG. 16 is an exploded view of the arcuate housing 140, as shown in FIG. 15, including inserts for coupling the arcuate housing 140 to a bracket, and a fastener for securing the cable assembly 142. As illustrated, the protrusion 158 includes two openings 164 configured to facilitate passage of the bolts 160 shown in FIG. 15. In the present embodiment, a pair of inserts 166 are aligned with the openings 164 and configured to secure the bolts 160 to the housing 140. In certain embodiments, the inserts 166 may be secured to the housing 140 by an adhesive connection. For example, after the inserts 166 are aligned with the openings 164, resin may be poured into an interior of the protrusion 158. Once the resin cures/hardens, the inserts 166 will be rigidly coupled to the arcuate housing 140. In certain embodiments, an inner surface of each insert 166 may be threaded. In such embodiments, threaded bolts 160 may interface with the threaded inserts 166, thereby securing the antenna 136 to the mounting assembly 54. While two openings 164 and two inserts 166 are employed in the present embodiment, it should be appreciated that more or fewer openings 164 and inserts 166 may be utilized in alternative embodiments. For example, certain embodiments may include 1, 2, 3, 4, 5, 6, 7, 8, or more openings 164 and a corresponding number of inserts 166.

In the present embodiment, the protrusion 146 includes an opening 168 configured to facilitate passage of the conductive wire 134 into the cable assembly 142. The opening 168 is also configured to enable the first connector 144 of the cable assembly 142 to be mounted to the arcuate housing 140. Specifically, the antenna 136 includes a gland 170 and a fastener 172 (e.g., nut or female threaded fastener) configured to interface with an extension 174 (e.g., male threaded fastener) of the first connector 144. To couple the cable assembly 142 to the arcuate housing 140, the extension 174 of the first connector 144 may be inserted through the opening 168. Next, the gland 170 may be disposed onto the extension 174 to establish a seal between the connector 144 and the housing 140, thereby substantially blocking contaminants from entering an interior of the arc antenna 136. Finally, the fastener 172 may be secured to the extension 174, thereby coupling the connector 144 to the housing 140. Once mounted to the housing 140, the cable assembly 142 may communicatively couple the antenna 136 to the data collection system 107.

Figure 17:
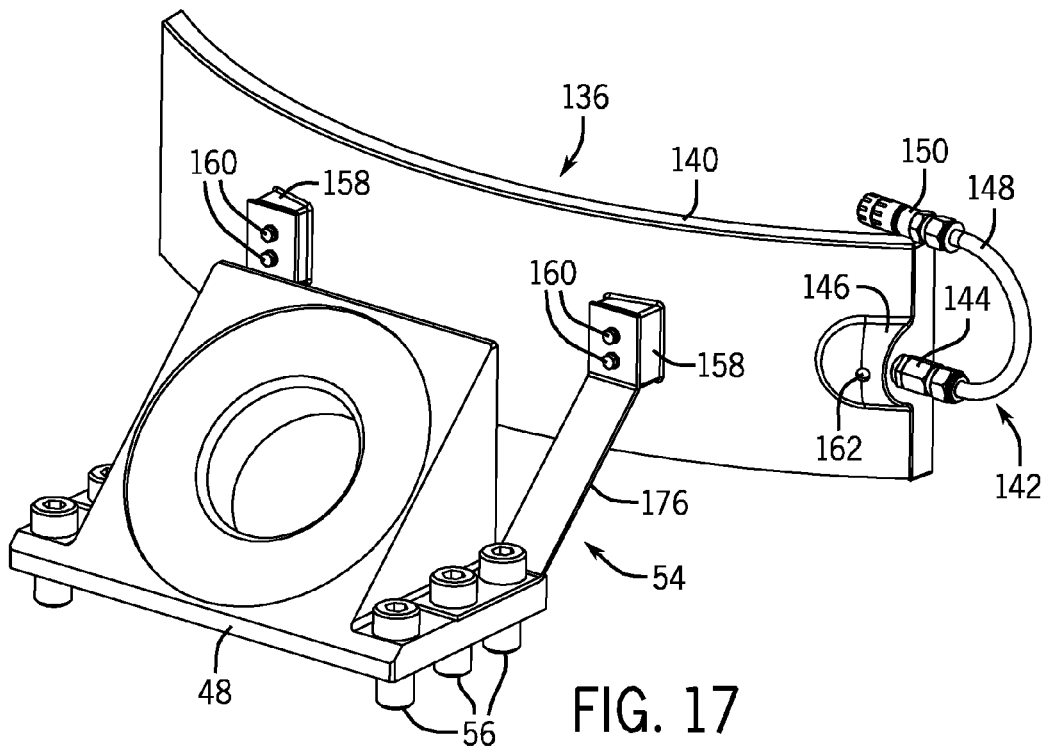
FIG. 17 is a perspective view of an alternative embodiment of an antenna mounting assembly configured to secure the arc antenna to a bearing.

FIG. 17 is a perspective view of an alternative embodiment of the antenna mounting assembly 54 configured to secure the arc antenna 136 to the bearing 48. As illustrated, the antenna mounting assembly 54 includes a bracket 176 coupled to the antenna 136 and to the bearing 48, thereby supporting the antenna 136 relative to the gimbal 38. Specifically, the bracket 176 is secured to the bearing 48 by the fasteners 56. Because the fasteners 56 are employed to secure the bearing 48 to the base plate 50, the antenna 136 may be mounted to the gimbal 38 without any modification to the gimbal structure, and without the permanent addition of mounting hardware. In addition, because the bracket 176 is secured to the bearing 48 with two fasteners 56, rotation of the bracket 176 relative to the bearing 48 will be substantially blocked. In the present embodiment, the bracket 176 is secured to the protrusion 158 of the arcuate housing 140 by the bolts 160. However, it should be appreciated that other coupling techniques, such as an adhesive connection, may be employed in alternative embodiments. As discussed in detail below, a second mounting assembly 54 may be disposed on the opposite circumferential side of the bearing 48. Such a configuration facilitates mounting of the antenna 136 to the gimbal 38 without any structural modification to the gimbal 38. In alternative embodiments, the gimbal 38 may be specifically modified to accommodate the antennas 136.

FIG. 18 is an exploded view of the antenna mounting assembly 54, as shown in FIG. 17, including the bracket 176 configured to mount to the bearing 48 via multiple fasteners 56. While one mounting assembly 54 is shown, it should be appreciated that a second mounting assembly 54 may be disposed on the opposite circumferential side of the bearing 48. As illustrated, the bracket 176 includes a first mounting portion 178 configured to interface with the bearing 48, and a second mounting portion 180 configured to interface with the arcuate housing 140. As previously discussed, the bracket 176 is secured to the bearing 48 by two fasteners 56. Consequently, the first mounting portion 178 of the bracket 176 includes two openings 182 configured to receive the two fasteners 56. In this configuration, the fasteners 56 may be disposed through the openings 182 of the first mounting portion 178 and into the openings 67 in the bearing 48, thereby securing the bracket 176 to the bearing 48. While the bracket 176 is secured to the bearing 48 by two fasteners 56 in the present embodiment, it should be appreciated that more fasteners 56 (e.g., 3 or more) may be employed in alternative embodiments.

Similar to the first mounting portion 178, the second mounting portion 180 includes two openings 184 configured to receive two bolts 160. As illustrated, a washer (e.g., lock washer) 186 may be disposed onto each bolt 160 prior to inserting the bolts 160 into the openings 184. To couple the second portion 180 of the bracket 176 to the protrusion 158 of the arcuate housing 140, the openings 184 of the second portion 180 may be aligned with the openings 164 of the protrusion 158. Next, the washers 186 may be disposed onto the bolts 160. Finally, the bolts 160 may be inserted through the openings 184 and into the openings 164. As previously discussed, inserts 166 may be disposed within the protrusion 158 and aligned with the openings 164. Consequently, the bolts 160 will interface with the inserts 166 when inserted into the openings 164, thereby securing the bracket 176 to the arcuate housing 140.

FIG. 19 is a bottom view of the antenna mounting assembly 54 as shown in FIG. 17. As illustrated, the arc antenna 136 is secured to the bearing 48 by a first mounting assembly 188 and a second mounting assembly 190. As previously discussed, each mounting assembly 188 and 190 is coupled to the bearing 48 by the fasteners 56 and to the protrusions 158 by the bolts 160, thereby securing the arcuate housing 140 to the bearing 48. Because each bracket 176 is secured to the bearing 48 by two fasteners 56, rotation in the directions 78 and 79 is blocked by contact between the fasteners 56 and the bracket 176. Consequently, movement of the antenna 136 relative to the bearing 48 will be substantially blocked. Because the fasteners 56 are employed to secure the bearing 48 to the base plate 50, the antenna 136 may be mounted to the gimbal 38 without any modification to the gimbal structure, and without the permanent addition of mounting hardware.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a spider configured to support a plurality of mineral extraction riser segments;
a gimbal disposed below the spider and configured to support the spider during operation; and
one or more arcuate radio frequency identification (RFID) antennas disposed within the gimbal, the spider, or a combination thereof, wherein the one or more RFID antennas are configured to energize and communicate with one or more RFID tags coupled to each riser segment.

2. The system of claim 1, wherein each riser segment includes a flange disposed at each longitudinal end, and wherein at least one flange of each riser segment includes the one or more RFID tags.

3. The system of claim 2, wherein each flange of each riser segment includes at least one RFID tag.

4. The system of claim 2, wherein each flange of each riser segment includes two RFID tags, the RFID tags being disposed approximately 180 degrees apart about a circumference of the flange.

5. The system of claim 4, wherein the gimbal includes two arcuate RFID antennas disposed approximately 180 degrees apart about a circumference of the gimbal, and wherein a read range of at least one arcuate RFID antenna encompasses at least one RFID tag throughout a range of motion of the riser segment within the gimbal.

6. The system of claim 1, wherein the one or more arcuate RFID antennas each comprise an arcuate read range.

7. The system of claim 6, wherein a radius of curvature of the one or more arcuate RFID antennas is substantially equal to a radius of curvature of a bore of the gimbal.

8. The system of claim 1, wherein each arcuate RFID antenna is mounted to a bearing of the gimbal by a support bracket.

9. A system comprising:
a spider configured to support a mineral extraction riser segment;
a gimbal disposed below the spider and configured to support the spider during operation;
a first antenna disposed on the gimbal at a first antenna position, wherein the first antenna is configured to receive identification information from a first transmitter mounted on a flange of the riser segment at a first transmitter position; and
a second antenna disposed on the gimbal at a second antenna position approximately 180 degrees offset from the first antenna position, wherein the second antenna is configured to receive identification information from a second transmitter mounted on the flange of the riser segment at a second transmitter position approximately 180 degrees offset from the first transmitter position.

10. The system of claim 9, wherein first transmitter is within range of the first antenna, the second transmitter is within range of the second antenna, or a combination thereof, throughout a range of motion of the riser segment within the gimbal.

11. The system of claim 9, wherein the first antenna and the second antenna are each mounted to a bearing of the gimbal by a plurality of support brackets.

12. The system of claim 9, wherein the first and second transmitters each comprise a radio frequency identification (RFID) tag, and the first and second antennas each comprise an RFID antenna.

13. The system of claim 9, wherein the first and second antennas each comprise an arc antenna having an arcuate read range.

14. The system of claim 9, wherein the riser segment comprises a first flange disposed on a first longitudinal end of the riser segment and a second flange disposed on a second longitudinal end of the riser segment, opposite the first longitudinal end, and wherein each flange includes the first and second transmitters.

15. A system, comprising:
a set of first and second wireless receivers disposed on opposite sides of an annular bore, wherein the first and second wireless receivers comprise opposing first and second read ranges less than an area of the annular bore; and
a set of first and second wireless transmitters disposed on opposite sides of an annular structure disposed in the annular bore, wherein the first and second wireless transmitters remain within at least one of the first and second read ranges as the annular structure moves within the annular bore.

* * * * *